United States Patent
Nakayama et al.

(10) Patent No.: US 10,228,905 B2
(45) Date of Patent: Mar. 12, 2019

(54) POINTING SUPPORT APPARATUS AND POINTING SUPPORT METHOD

(71) Applicant: FUJITSU LIMITED, Kawasaki-shi, Kanagawa (JP)

(72) Inventors: Hiroshi Nakayama, Kawasaki (JP); Junichi Odagiri, Kawasaki (JP); Satoshi Nakashima, Kawasaki (JP); Kentaro Murase, Yokohama (JP); Masakiyo Tanaka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 15/434,439

(22) Filed: Feb. 16, 2017

(65) Prior Publication Data

US 2017/0249124 A1    Aug. 31, 2017

(30) Foreign Application Priority Data

Feb. 29, 2016 (JP) .................... 2016-037415

(51) Int. Cl.

| G06F 3/048 | (2013.01) |
|---|---|
| G06F 3/16 | (2006.01) |
| G06F 3/0481 | (2013.01) |
| G06F 3/0487 | (2013.01) |
| G06F 3/01 | (2006.01) |
| G06F 3/0482 | (2013.01) |
| G06F 3/0484 | (2013.01) |

(52) U.S. Cl.
CPC .............. *G06F 3/167* (2013.01); *G06F 3/013* (2013.01); *G06F 3/0481* (2013.01); *G06F 3/0482* (2013.01); *G06F 3/0487* (2013.01); *G06F 3/04812* (2013.01); *G06F 3/04842* (2013.01)

(58) Field of Classification Search
CPC .......... G06F 3/013; G06F 3/017; G06F 3/012; G06F 2203/0381; G06F 3/167
See application file for complete search history.

(56) References Cited

U.S. PATENT DOCUMENTS

| 7,881,493 B1* | 2/2011 | Edwards ............ G06K 9/00597 348/78 |
|---|---|---|
| 9,922,651 B1* | 3/2018 | Nelson ..................... G10L 15/26 |
| 2005/0108092 A1* | 5/2005 | Campbell ............... A61B 3/113 705/14.64 |
| 2006/0209013 A1* | 9/2006 | Fengels ................. G06F 3/0325 345/156 |

(Continued)

OTHER PUBLICATIONS

Ogana et al., Home position recognition methods using polarizing films for an eye-gaze interface system; 2016, IEEE; 6 pages.*

(Continued)

*Primary Examiner* — Linh K Pham
(74) *Attorney, Agent, or Firm* — Staas & Halsey LLP

(57) ABSTRACT

A pointing support apparatus includes a memory, and a processor coupled to the memory and configured to detect a line-of-sight position of a user on a screen, extract a command included in a search range of the screen with reference to the line-of-sight position, generate a table in which the command and speech information of the command are associated with each other, and decide, when speech information from outside is accepted, a command based on comparison of the recognized speech information and the speech information of the table.

10 Claims, 19 Drawing Sheets

(56) References Cited

U.S. PATENT DOCUMENTS

| | | | | |
|---|---|---|---|---|
| 2007/0066916 | A1* | 3/2007 | Lemos | A61B 3/113 600/558 |
| 2009/0315827 | A1* | 12/2009 | Elvesjo | G06F 3/013 345/157 |
| 2011/0313768 | A1* | 12/2011 | Klein | G06F 3/017 704/251 |
| 2012/0293406 | A1* | 11/2012 | Park | G06F 1/1626 345/156 |
| 2013/0027302 | A1* | 1/2013 | Iwaizumi | G06F 1/1686 345/158 |
| 2013/0050432 | A1* | 2/2013 | Perez | G02B 27/017 348/47 |
| 2013/0169533 | A1* | 7/2013 | Jahnke | G06F 3/017 345/158 |
| 2013/0176208 | A1* | 7/2013 | Tanaka | G06F 3/013 345/156 |
| 2013/0295994 | A1* | 11/2013 | Guitteaud | F16M 13/00 455/556.1 |
| 2013/0300636 | A1* | 11/2013 | Cunningham | G10L 13/02 345/8 |
| 2014/0237367 | A1* | 8/2014 | Jung | G06F 3/167 715/728 |
| 2015/0217870 | A1* | 8/2015 | McCullough | G08G 5/0021 704/275 |

OTHER PUBLICATIONS

Ghani et al., Combining eye gaze and hand tracking for pointer control in HCI: Developing a more robust and accurate interaction system for pointer positioning and clicking; 2013; IEEE; 6 pages.*

Takehiko Ohno, Features of eye gaze interface for selection tasks; 2002; IEEE; 6 pages.*

Dave et al.; Eye-ball tracking system for motor-free control of mouse pointer; IEEE; 2017; 5 pages.*

Asai et al., Eye mark pointer in immersive projection display; 2000; IEEE; 8 pages.*

(Japanese) "Method of Using Speech Recognition", Microsoft Internet [Searched on Feb. 10, 2016] http://windows.microsoft.com/ja-jp/windows-8/using-speech-recognition (English) "How to use Speech Recognition in Windows", Microsoft Internet [Searched on Feb. 10, 2016] https://support.microsoft.com/en-us/help/14213/windows-how-to-usespeech-recognition.

* cited by examiner

FIG. 3

| EXTRACTION COMMAND CHARACTER CODE STRING | POSITION COORDINATES | SPEECH RECOGNITION DATA |
|---|---|---|
| CHARACTER CODE STRING OF "NOVEL" | (x1,y1) | SPEECH RECOGNITION DATA OF "navəl" |
| CHARACTER CODE STRING OF "REPLY" | (x2,y2) | SPEECH RECOGNITION DATA OF "riplai" |
| CHARACTER CODE STRING OF "TRANSFER" | (x3,y3) | SPEECH RECOGNITION DATA OF "trænsfəːr" |
| CHARACTER CODE STRING OF "SEARCH" | (x4,y4) | SPEECH RECOGNITION DATA OF "səːrtʃ" |

FIG. 4

| COMMAND CHARACTER CODE STRING | SPEECH RECOGNITION DATA |
|---|---|
| CHARACTER CODE STRING OF "RECEPTION" | SPEECH RECOGNITION DATA OF "rɪsepʃən" |
| CHARACTER CODE STRING OF "TRANSMISSION" | SPEECH RECOGNITION DATA OF "trænsmɪʃən" |
| CHARACTER CODE STRING OF "NOVEL" | SPEECH RECOGNITION DATA OF "nɑvəl" |
| CHARACTER CODE STRING OF "REPLY" | SPEECH RECOGNITION DATA OF "rɪplaɪ" |
| CHARACTER CODE STRING OF "TRANSFER" | SPEECH RECOGNITION DATA OF "trænsfəːr" |
| CHARACTER CODE STRING OF "SEARCH" | SPEECH RECOGNITION DATA OF "səːrtʃ" |
| CHARACTER CODE STRING OF "CLASSIFICATION" | SPEECH RECOGNITION DATA OF "klæsəfɪkeɪʃən" |

| ROUTE DEFINITION IDENTIFICATION INFORMATION | PROCEDURE 1 | PROCEDURE 2 | PROCEDURE 3 | PROCEDURE 4 |
|---|---|---|---|---|
| FIRST ROUTE DEFINITION | PROCEDURE 1 OF FIRST ROUTE DEFINITION | PROCEDURE 2 OF FIRST ROUTE DEFINITION | - | - |
| SECOND ROUTE DEFINITION | PROCEDURE 1 OF SECOND ROUTE DEFINITION | PROCEDURE 2 OF SECOND ROUTE DEFINITION | - | - |
| THIRD ROUTE DEFINITION | PROCEDURE 1 OF THIRD ROUTE DEFINITION | PROCEDURE 2 OF THIRD ROUTE DEFINITION | PROCEDURE 3 OF THIRD ROUTE DEFINITION | PROCEDURE 4 OF THIRD ROUTE DEFINITION |
| ... | | | | |

253

US 10,228,905 B2

POINTING SUPPORT APPARATUS AND POINTING SUPPORT METHOD

CROSS-REFERENCE TO RELATED APPLICATION

This application is based upon and claims the benefit of priority of the prior Japanese Patent Application No. 2016-037415, filed on Feb. 29, 2016, the entire contents of which are incorporated herein by reference.

FIELD

The present embodiments relate to a pointing support apparatus and a pointing support method.

BACKGROUND

In recent years, information apparatus including a graphical user interface (GUI) such as a personal computer (PC), a tablet terminal, or a smartphone have become popular. A user operates the information apparatus by pointing to a target such as an icon, a button, or a command tab located at an arbitrary position of the GUI.

Pointing to an information apparatus is performed by an operation of a mouse by an upper limb of its user or by an operation by a finger of a hand on a touch pad or a touch panel. Therefore, a physically disabled person, an elderly or the like having an upper limb or a finger of a hand that does not function well is difficult to operate an information apparatus that includes a GUI.

In connection with this problem, there is a conventional technology which executes, even if a user does not perform a direct operation by an upper limb or a finger of a hand, speech recognition of the user and makes it possible to perform pointing.

FIG. 19 is a view illustrating a conventional technology. According to the conventional technology, if it is recognized that a user utters "show numbers" in a state in which a window 10A is open, the following processes are performed. The conventional technology allocates, to a region corresponding to a button, an icon, a command tab or the like that may be selected on the window 10A by a mouse, a unique number so as to be displayed. The user utters the number allocated to the region to be selected, and the conventional technology decides the selected region by speech recognition. For example, if the user refers to each of the numbers in the window 10A and wants to select the region of the number "10" in FIG. 19, the user utters "ten," and the conventional technology decides by speech recognition that the region of the number "10" is selected.

CITATION LIST

Non Patent Document

[Non Patent Document 1] MicroSoft, "Method of Using Speech Recognition," [Searched on Feb. 10, 2016], Internet <URL: http://windows.microsoft.com/ja-jp/windows-8/using-speech-recognition>

SUMMARY

According to an aspect of the embodiments, a pointing support apparatus includes a memory, and a processor coupled to the memory and configured to detect a line-of-sight position of a user on a screen, extract a command on the screen included in a search range with reference to the line-of-sight position, generate a table in which the command and speech information of the command are associated with each other, and decide, when speech information from outside is accepted, a command based on comparison of the recognized speech information and the speech information of the table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of a data structure of a command dictionary table according to the working example 1;

FIG. 4 is a view illustrating an example of a data structure of a command dictionary cache table according to the working example 1;

FIG. 7 is a view illustrating an example of a data structure of a route definition table;

DESCRIPTION OF EMBODIMENTS

The conventional technology described above has a problem in that it is difficult to execute pointing efficiently.

Since there is the tendency that the recognition rate degrades as the utterance period decreases, if a number is uttered as in the conventional technology, the utterance period is sometimes so short that it is difficult to appropriately decide a region desired by a user. Further, in the conventional technology, since a different number is allocated every time to the same button of the same window, the conventional technology is not good in convenience in use to its user. Further, in the conventional technology, a number is displayed in an overlapping relationship with information displayed on an icon, a button, or a command tab till then, there is a problem also in that the original command is not noticed readily.

In an aspect, it is an object of the present embodiments to provide a pointing support apparatus, a pointing support method, and a pointing support program by which pointing may be executed efficiently.

In the following, working examples of a pointing support apparatus, a pointing support method, and a pointing support program according to the embodiments are described in detail with reference to the drawings. It is to be noted that the present embodiments shall not be restricted by the working examples.

Working Example 1

Figure 1:
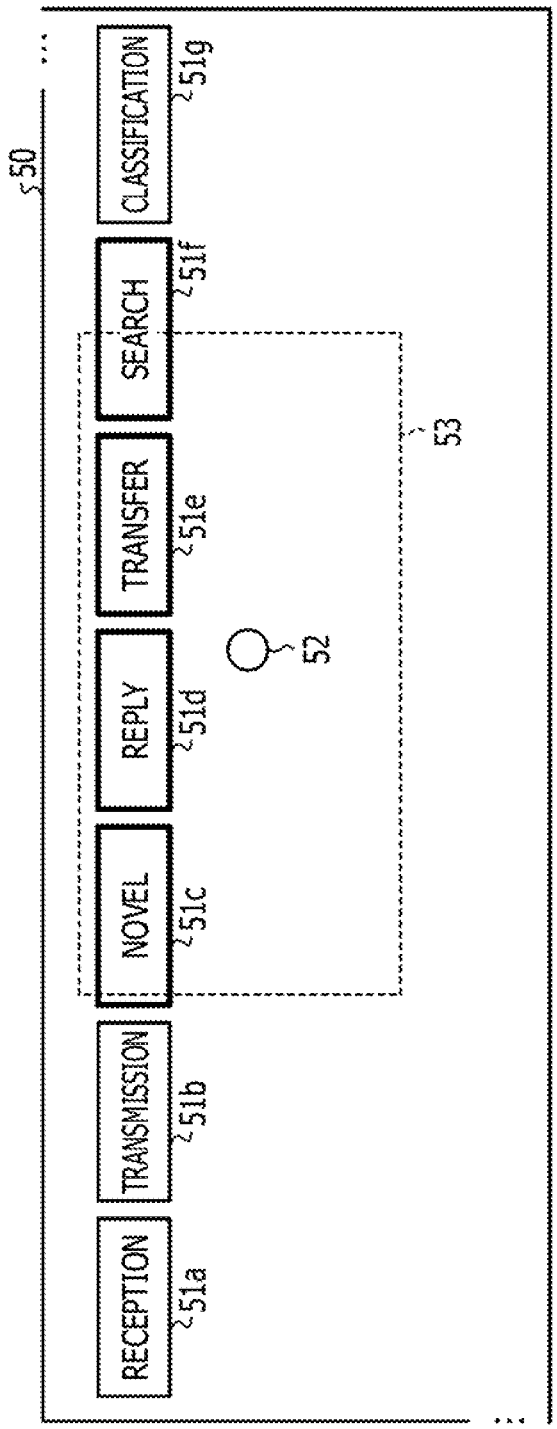
FIG. 1 is a view illustrating an example of processes of a pointing support apparatus according to a working example 1.

FIG. 1 is a view illustrating an example of processes of a pointing support apparatus according to a working example 1. An application screen image 50 depicted in FIG. 1 includes commands 51*a*, 51*b*, 51*c*, 51*d*, 51*e*, 51*f*, and 51*g*. The pointing support apparatus executes line-of-sight detection of a user to detect a line-of-sight, position 52. The pointing support apparatus extracts the commands 51*c*, 51*d*, 51*e*, and 51*f* included in a search range 53 centered at the position of the line-of-sight position 52.

The pointing support apparatus generates a command dictionary table to be used for speech recognition of the commands 51*c*, 51*d*, 51*e*, and 51*f*. For example, the pointing support apparatus registers information that associates the command 51*c* with speech recognition data "novel (navel)" and associates the command 51*d* with speech recognition data "reply (riplai)" into the command dictionary table. Further, the pointing support apparatus registers information that associates the command 51*e* with speech recognition data "transfer (trænsfəɪ)" and associates the command 51*f* with speech recognition data "search (səɪtʃ)" into the command dictionary table.

For example, if the user utters "reply (riplai)," the pointing support apparatus executes speech recognition. The pointing support apparatus compares a result of the speech recognition and the individual speech recognition data of the command dictionary table with each other to specify the command "reply" of the speech recognition data corresponding to the result of the speech recognition. Then, the pointing support apparatus moves the position of the pointer to the position of the command 51*d* for replay.

When the pointing support apparatus executes such processes as illustrated in FIG. 1, a physically disabled person, an elderly or the like who suffers the inconvenience to the arms, hands, or feet may efficiently perform highly accurate selection of a command on a GUI screen image free from a stress without using a mouse or the like.

Figure 2:
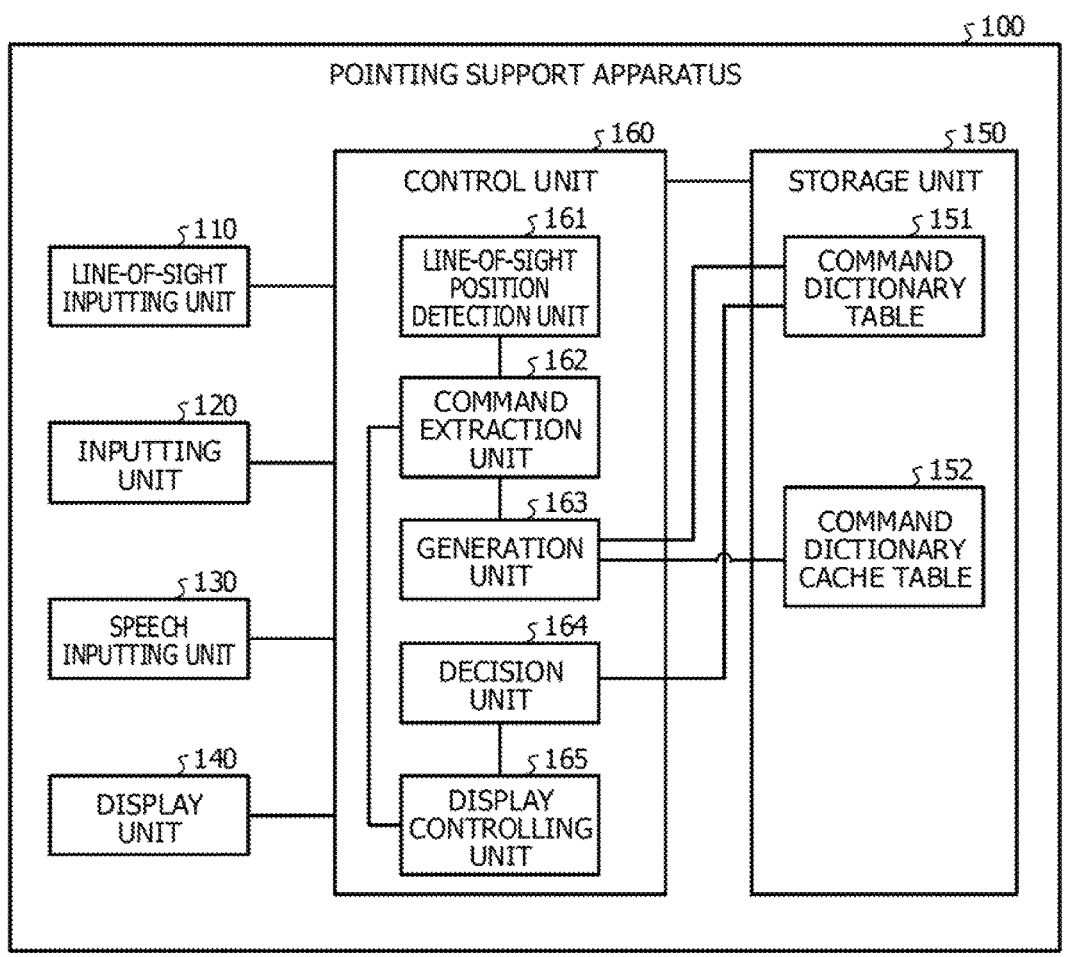
FIG. 2 is a functional block diagram depicting a configuration of a pointing support apparatus according to the working example 1.

Now, a configuration of the pointing support apparatus according to the working example 1 is described. FIG. 2 is a functional block diagram depicting a configuration of a pointing support apparatus according to the working example 1. As depicted in FIG. 2, a pointing support apparatus 100 includes a line-of-sight inputting unit 110, an inputting unit 120, a speech inputting unit 130, a display unit 140, a storage unit 150, and a control unit 160.

The line-of-sight inputting unit 110 is an apparatus for inputting a line of sight of a user. For example, the line-of-sight inputting unit 110 corresponds to a camera. The line-of-sight inputting unit 110 picks up an image of the face of the user and outputs data of the picked up face image to the control unit 160.

The inputting unit 120 is a switch including a button that may be depressed by the user. The inputting unit 120 outputs a signal representative of whether or not the button is depressed to the control unit 160.

The speech inputting unit 130 is an apparatus for acquiring speech uttered by the user. For example, the speech inputting unit 130 corresponds to a microphone. The speech inputting unit 130 outputs data of speech of the user to the control unit 160.

The display unit 140 is a display apparatus that displays various kinds of information outputted from the control unit 160. The display unit 140 corresponds to a liquid crystal display unit, a touch panel or the like.

The storage unit 150 includes a command dictionary table 151 and a command dictionary cache table 152. The storage unit 150 corresponds to a semiconductor memory element such as a random access memory (RAM), a read only memory (ROM), or a flash memory or a storage apparatus such as a hard disk drive (HDD).

The command dictionary table 151 corresponds to the command dictionary table described with reference to FIG. 1 and associates information of a command and speech recognition data of the command with each other. FIG. 3 is a view illustrating an example of a data structure of a command dictionary table according to the working example 1. As illustrated in FIG. 3, the command dictionary table 151 associates an extraction command character code string, position coordinates, and speech recognition data with one another.

Referring to FIG. 3, the extraction command character code string indicates a character code string of a command extracted from within a search range on a screen image centered at the position of the line-of-sight position. The position coordinates indicate position coordinates of an extracted command on the screen image. The speech recognition data is speech data for recognizing a command. For example, in a record of the first row of FIG. 3, a character code string of "novel" is registered; coordinates "x1, y1" of the command of "novel" are registered; and speech recognition data of "navel" is registered.

The command dictionary cache table 152 is a table used to make generation of the command dictionary table 151 efficient. FIG. 4 is a view illustrating an example of a data structure of a command dictionary cache table according to the working example 1. As illustrated in FIG. 4, the command dictionary cache table 152 associates a command character code string and speech recognition data with each other.

Referring to FIG. 4, the command character code string indicates character code strings of all commands included in a screen image. The speech recognition data is speech data for recognizing each command. For example, in a record of the first row in FIG. 4, a character code string of "reception" is registered, and speech recognition data of "risepfən" is registered.

Referring back to FIG. 2, the control unit 160 includes a line-of-sight position detection unit 161, a command extraction unit 162, a generation unit 163, a decision unit 164, and a display controlling unit 165. The control unit 160 corresponds to an integrated apparatus such as an application specific integrated circuit (ASIC) or a field programmable gate array (FPGA). Further, the control unit 160 corresponds to an electronic circuit such as a central processing unit (CPU) and a micro processing unit (MPU).

The line-of-sight position detection unit 161 is a processing unit that detects a line-of-sight position of the user on a screen image of the display unit 140. The line-of-sight position detection unit 161 outputs information of the line-of-sight position to the command extraction unit 162.

The line-of-sight position detection unit 161 may detect the line-of-sight position of the user using any conventional technology. For example, every time the line-of-sight position detection unit 161 acquires face image data from the line-of-sight inputting unit 110, the line-of-sight position detection unit 161 performs image analysis of the face image data to specify a reference point and a moving point of the eyes of the user. The line-of-sight position detection unit 161 detects the line-of-sight position of the user from a relationship between the reference point and the moving point. The set of a reference point and a moving point corresponds to a set of an inner corner and the iris relating to an eye of the user or a set of corneal reflection and the pupil, relating to an eye of the user. The line-of-sight position detection unit 161 may detect the line-of-sight position using the technology disclosed in Japanese Laid-open Patent Publication No. 2012-187190.

The command extraction unit 162 is a processing unit that specifies an initial position of a line-of-sight position and extracts a command on a screen image included in a search range with respect to an initial positions. For example, the command extraction unit 162 specifies, as the initial position, the line-of-sight position at a timing at which the inputting unit 120 is depressed by the user. The command extraction unit 162 outputs information of the extracted command to the generation unit 163 and the display controlling unit 165. For example, the information of the command is information that associates a character code string of the command and position coordinates of the command with each other.

The command extraction unit 162 may extract a command within a search range on a screen image using any conventional technology. For example, screen image information that individually defines positions of commands displayed on the screen image and character code strings, attributes and so forth of the commands and a search range with respect to the initial position are compared with each other to extract information of the commands.

The generation unit 163 is a processing unit that generates a command dictionary table 151 based on information of a command acquired from the command extraction unit 162. In the following processes of the generation unit 163 are described. The generation unit 163 generates a command dictionary cache table 152 in advance before it generates a command dictionary table 151.

An example of a process performed when the generation unit 163 generates a command dictionary cache table 152 is described. If the generation unit 163 detects that a screen image is rendered operative by a user, the generation unit 163 scans the screen image information of the active screen image and extracts character code strings of all commands included in the screen image. The generation unit 163 registers the extracted character code strings into the command character code string of the command dictionary cache table 152.

The generation unit 163 generates speech recognition data corresponding to the character code strings registered in the command dictionary cache table 152 and registers the generated speech recognition data in an associated relationship with the character code strings into the command dictionary cache table 152.

The generation unit 163 may generate speech recognition data corresponding to a character code string using any conventional technology. For example, the generation unit 163 analyzes each character code string to specify a way of reading and combines sounds corresponding to the respective characters of the way of reading to generate speech recognition data.

For example, the generation unit 163 analyzes the character code string "novel" to specify the way of reading "naval" and combines sounds corresponding to the respective characters "n," "a," "v," "ə ," and "l" to generate speech recognition data of the character code string "novel." It is to be noted that the sounds of the respective characters are stored in a sound database not depicted, and the generation unit 163 refers to the sound database to acquire data of the sounds of the respective characters.

It is, to be noted that, while the foregoing description is directed to a case in which the generation unit 163 generates a command dictionary cache table 152 in advance and, when the generation unit 163 generates a command dictionary table 151, it uses the command dictionary cache table 152, the generation of a command dictionary table 151 is not limited to this. For example, the generation unit 163 may directly generate a command dictionary table 151 without generating a command dictionary cache table 152.

Now, an example of processes performed when the generation unit 163 utilizes a command dictionary cache table 152 to generate a command dictionary table 151 is described. If the generation unit 163 accepts information of commands from the command extraction unit 162, the generation unit 163 registers character code strings of the commands and position coordinates of the commands in an associated relationship with each other into the command dictionary table 151.

Besides, the generation unit 163 compares the character code strings of the commands and the command dictionary cache table 152 with each other and acquires speech recognition data associated with character code strings same as the character code strings of the commands from the command dictionary cache table 152. The generation unit 163 registers the acquired speech recognition data in an associated relationship with the character code strings into the command dictionary table 151.

For example, it is assumed that the generation unit 163 acquires the character code string "novel" of a command from the command extraction unit 162. In this case, the generation unit 163 acquires the speech recognition data of "naval" corresponding to the character code string "novel" of the command from the command dictionary cache table 152. The generation unit 163 registers the character code string of "novel" and the speech recognition data of "naval" in an associated relationship with each other into the command dictionary table 151.

The decision unit 164 is a processing unit that decides a command based on data of speech of the user from the speech inputting unit 130 and the command dictionary table 151. The decision unit 164 outputs the position coordinates of the command to the display controlling unit 165. In the following description, data of speech of the user is referred to suitably as speech data.

Here, processes of the decision unit 164 are described concretely. The decision unit 164 compares speech data and each piece of the speech recognition data of the command dictionary table 151 with each other and calculates the degree of similarity between them. The decision unit 164 specifies the speech recognition data that exhibits the highest degree of similarity with the speech data and decides that the command associated with the specified speech recognition data is selected. The decision unit 164 outputs position coordinates of the command associated with the specified speech recognition data to the display controlling unit 165.

For example, it is assumed that the decision unit 164 decides, through comparison between the speech data and each piece of the speech recognition data with each other, to calculate the degree of similarity between them, that the speech recognition data of "riplai" and the speech data indicate the highest degree of similarity. In this case, the decision unit 164 decides that the command "reply" is selected and outputs the position coordinates (x2, y2) of the command "reply" to the display controlling unit 165.

It is to be noted that, when the decision unit 164 compares the speech data and each piece of the speech recognition data and calculates the degree of similarity between them, if each of the degrees of similarity is lower than a threshold value, the decision unit 164 may not perform the process for deciding the command and may acquire speech data again from the speech inputting unit 130 and execute the processes described above.

The display controlling unit 165 is a processing unit that performs a process of outputting screen image information not depicted to the display unit 140 so that the screen image information is displayed on the display unit 140 or a process of accepting movement of the pointer or selection of a command in response to an operation of the decision unit 164 or the inputting unit 120. The display controlling unit 165 executes, when it accepts selection of a command, a process in accordance with the selection of a command and causes the display unit 140 to display a result of the process.

For example, if the display controlling unit 165 acquires position coordinates from the decision unit 164, the display controlling unit 165 causes the pointer to move to a position on the screen image corresponding to the position coordinates. If the display controlling unit 165 accepts a signal that the button is depressed from the inputting unit 120, the display controlling unit 165 decides that the command at the position overlapping with the pointer is selected and executes a process in accordance with the command.

Further, the display controlling unit 165 acquires information of commands on the screen image which are included in the search range from the command extraction unit 162 and emphatically displays the region of the commands included in the search range.

Figure 5:
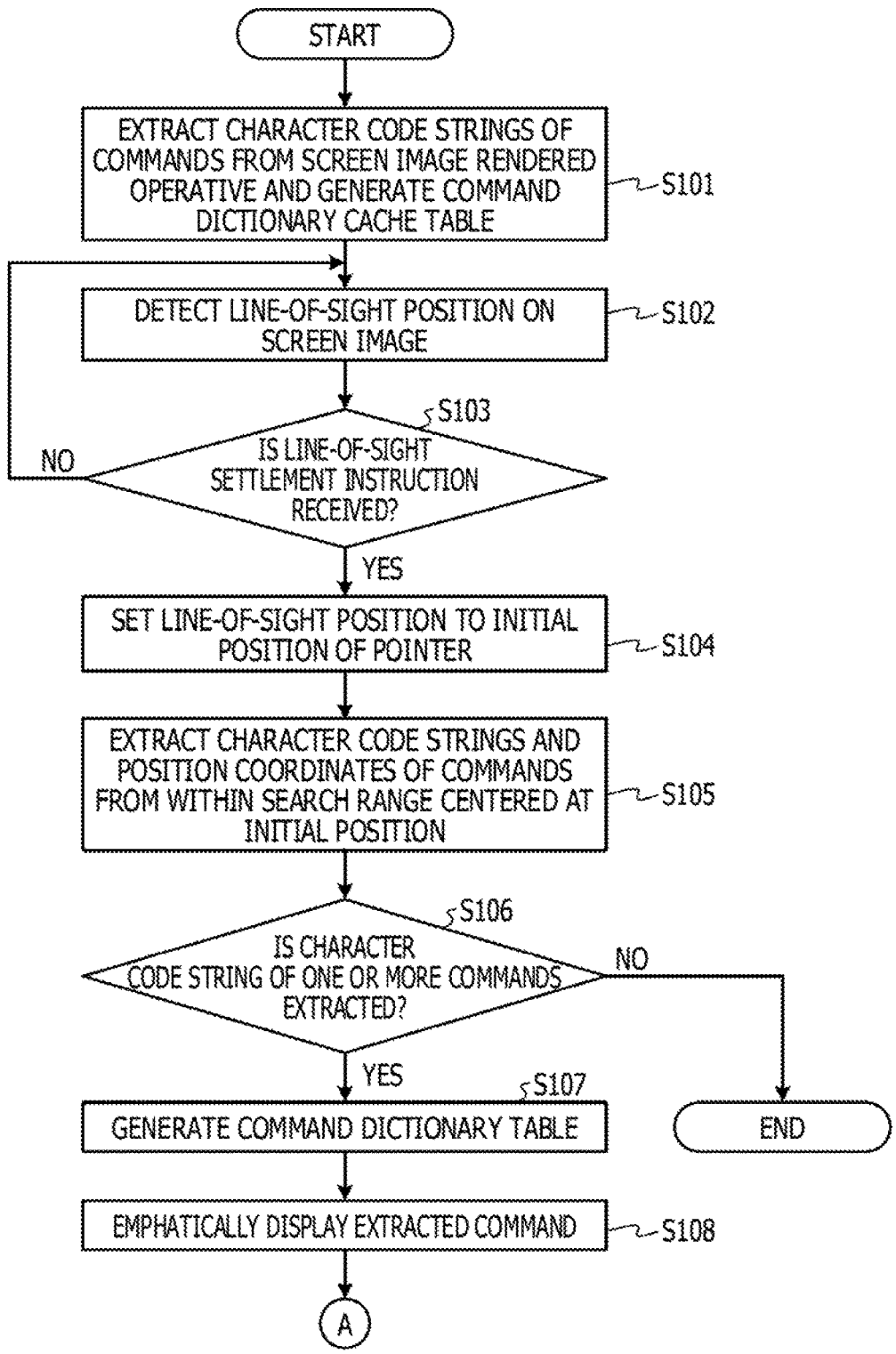
FIG. 5 is a flow chart illustrating a processing procedure of a pointing support apparatus according to the working example 1.
Figure 6:
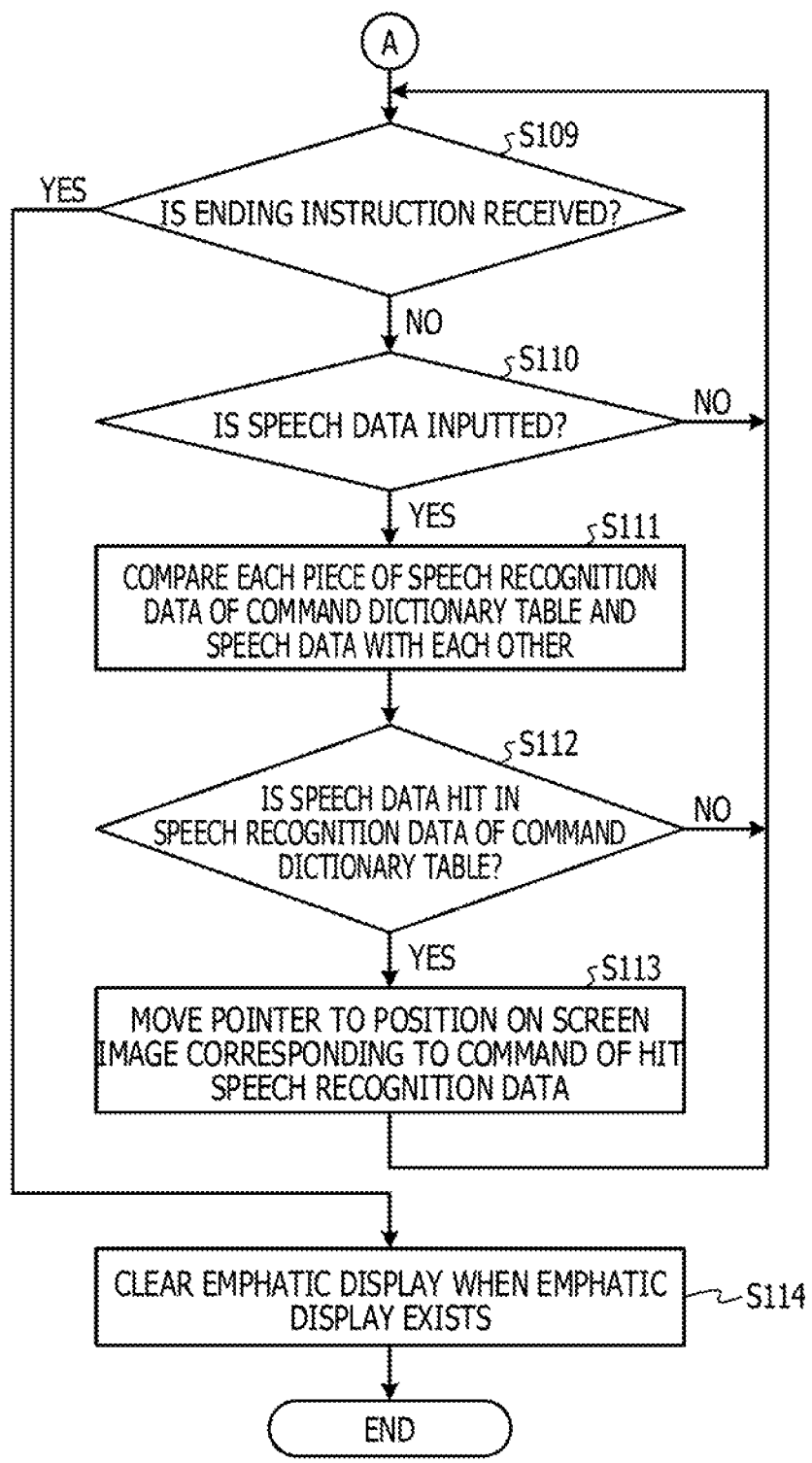
FIG. 6 is a flow chart illustrating a processing procedure of the pointing support apparatus according to the working example 1.

Now, a processing procedure of the pointing support apparatus 100 according to the working example 1 is described. FIGS. 5 and 6 are flow charts illustrating a processing procedure of a pointing support apparatus according to the working example 1. As illustrated in FIG. 5, the generation unit 163 of the pointing support apparatus 100 extracts character code strings of commands from a screen image rendered operative and generates a command dictionary cache table 152 (step S101).

The line-of-sight position detection unit 161 of the pointing support apparatus 100 detects the line-of-sight position on the screen image (step S102). The line-of-sight position detection unit 161 decides whether or not a line-of-sight settlement instruction is received (step S103). If a line-of-sight settlement instruction is not received (step S103, No), the line-of-sight position detection unit 161 advances the process to step S102. If a line-of-sight settlement instruction is received (step S103, Yes), the line-of-sight position detection unit 161 advances the process to step S104. For example, if the button of the inputting unit 120 is depressed by the user, the line-of-sight position detection unit 161 decides that a line-of-sight settlement instruction is received.

The command extraction unit 162 of the pointing support apparatus 100 sets the line-of-sight position to the initial position of the pointer (step S104). The command extraction unit 162 extracts character code strings and position coordinates of commands from within the search range at the center of the initial position (step S105). The command extraction unit 162 decides whether or not a character code string of one or more commands is extracted (step S106). If a character code string of one or more commands is not extracted (step S106, No), the command extraction unit 162 ends the process. If a character code string of one or more commands is extracted (step S106, Yes), the command extraction unit 162 advances the process to step S107.

The generation unit 163 of the pointing support apparatus 100 generates a command dictionary table 151 based on the command or commands extracted by the command extraction unit 162 and the command dictionary cache table 152 (step S107). The display controlling unit 165 of the pointing support apparatus 100 emphatically displays the extracted command or commands (step S108) and advances the process to step S109 of FIG. 6.

The display controlling unit 165 decides whether or not an ending instruction is received (step S109). If an ending instruction is received (step S109, Yes), the display controlling unit 165 advances the process to step S114. For example, if the display controlling unit 165 detects that the button of the inputting unit 120 is depressed short, the display controlling unit 165 decides that an ending instruction is received. Alternatively, if the user utters "end" in place of depressing the button of the inputting unit 120 and the display controlling unit 165 executes speech recognition and recognizes that "end" is uttered, the display controlling unit 165 may decide that an ending instruction is received.

If an emphatic display exists, the display controlling unit 165 clears the emphatic display (step S114) and ends the process. If an ending instruction is not received (step S109, No), the display controlling unit 165 advances the process to step S110.

The decision unit 164 of the pointing support apparatus 100 decides whether or not some speech data is inputted (step S110). If no speech data is inputted (step S110, No), the decision unit 164 advances the process to step S109. If some speech data is inputted (step S110, Yes), the decision unit 164 advances the process to step S111.

The decision unit 164 compares each piece of the speech recognition data of the command dictionary table 151 and the speech data with each other (step S111). The decision unit 164 decides whether or not the speech data is hit in some data for speech recognition in the command dictionary table 151 (step S112). If the speech data is not hit in any data for speech recognition in the command dictionary table 151 (step S112, No), the decision unit 164 advances the process to step S109. If the speech data is hit in some data for speech recognition in the command dictionary table 151 (step S112, Yes), the decision unit 164 advances the process to step S113.

The display controlling unit 165 moves the pointer to a position on the screen image corresponding to the command of the hit speech recognition data (step S113) and advances the process to step S109.

Now, an advantageous effect of the pointing support apparatus 100 according to the working example 1 is described. The pointing support apparatus 100 extracts commands included in a search range from a line-of-sight position of the user and decides that a command of the speech recognition data most similar to the speech input of the user from among the speech recognition data of the extracted commands is selected. Consequently, a physically disabled person, an elderly or the like having an arm, a hand, or a foot that does not function well may effectively perform highly accurate command selection of a GUI screen image free from a stress without using a mouse or the like.

The pointing support apparatus 100 extracts all commands on the screen image based on screen image information of the active screen image to generate a command dictionary cache table 152 in advance. When the pointing support apparatus 100 extracts commands included in the search range and generates a command dictionary table 151, the pointing support apparatus 100 utilizes the speech recognition data stored in the command dictionary cache table 152. In order to generate speech recognition data, a process of analyzing a character code string to specify a way of reading and combining sounds of characters corresponding to the specified way of reading is performed, and therefore, the processing load is heavy. Thus, since the pointing support apparatus 100 generates a command dictionary cache table 152 in advance, the pointing support apparatus 100 may not perform a process for generating speech recognition data every time the command extraction unit 162 extracts a command. Consequently, the processing load may be reduced.

Working Example 2

Now, a pointing support apparatus 200 according to a working example 2 is described. The pointing support apparatus 200 switchably applies a "process 1" to support pointing by a combination of a line-of-sight input and speech recognition described in connection with the working example 1 and a "process 2" different from the process 1 to support pointing. Processes relating to the process 1 are similar to the processes of the working example 1 described with reference to FIG. 1 and so forth, and therefore, description is omitted herein.

The "process 2" performed by the pointing support apparatus 200 is described. The pointing support apparatus 200 moves the pointer based on a route definition table. The route definition table is a table that retains route definition information that defines routes along which the pointer is moved and movement patterns of the routes. FIG. 7 is a view illustrating an example of a data structure of a route definition table. As depicted in FIG. 7, a route definition table 253 associates route definition identification information and a plurality of procedures with each other. The route definition identification information is information for uniquely identifying route definitions. Each procedure indicates a procedure for moving a route or a procedure for moving the pointer along a route. Although there are various route definitions, here, a first route definition, a second route definition, and a third route definition are described as an example.

Figure 8:
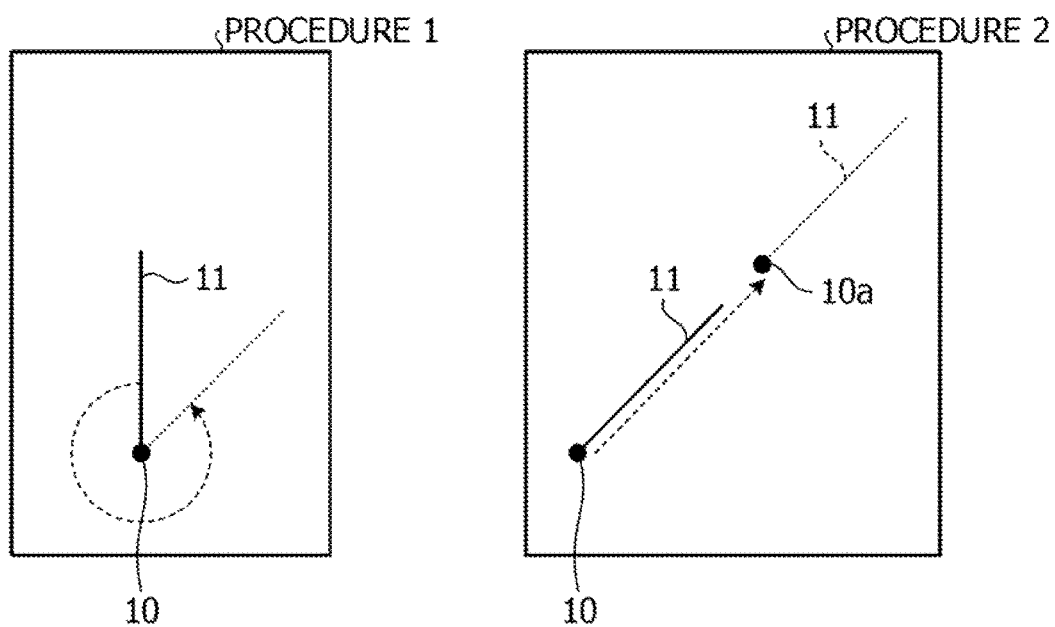
FIG. 8 is a view illustrating a first route definition.

FIG. 8 is a view illustrating a first route definition. The first route definition includes a procedure 1 and a procedure 2. The procedure 1 of the first route definition is a procedure of displaying a linear movement bar 11 from a pointer position 10 at present and rotationally moving the linear movement bar 11 around the center provided by the pointer position 10.

The procedure 2 of the first route definition is a procedure for linearly moving the linear movement bar 11, whose direction is settled by the procedure 1 of the first route definition, in a direction indicated by the linear movement bar 11. A pointer position 10a is moved in accordance with the movement of the linear movement bar 11. According to the first route definition, the route is the linear movement bar 11.

Figure 9:
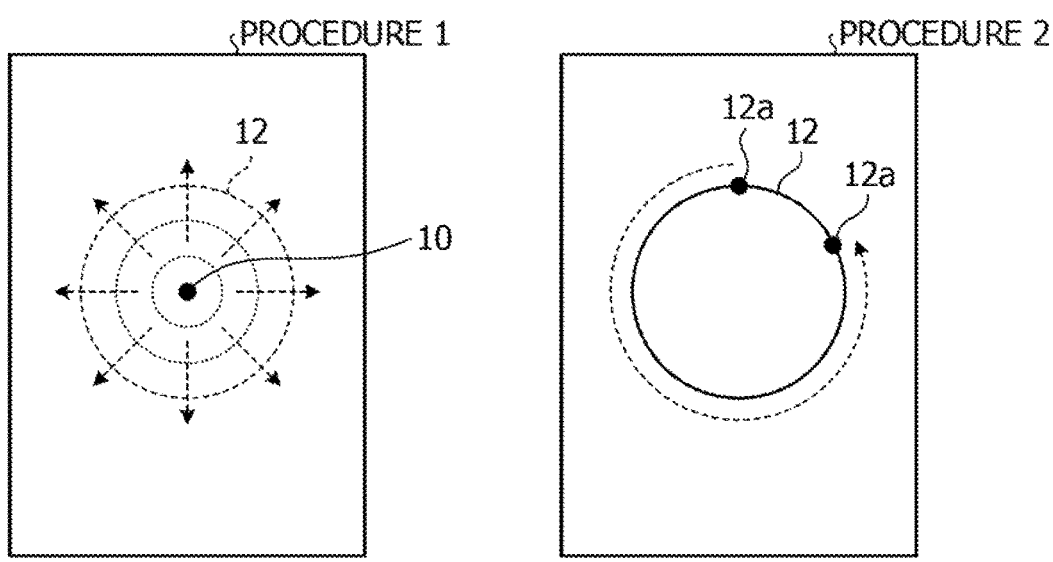
FIG. 9 is a view illustrating a second route definition.

FIG. 9 is a view illustrating a second route definition. The second route definition includes a procedure 1 and a procedure 2. The procedure 1 of the second route definition is a procedure for expanding a circle 12 centered at the pointer position 10 at present in a concentric relationship.

The procedure 2 of the second route definition is a procedure for moving a pointer position 12a along the circle 12 from an arbitrary position on the circle 12 settled by the procedure 1 of the second route definition. According to the second route definition, the route is the circle 12.

Figure 10:
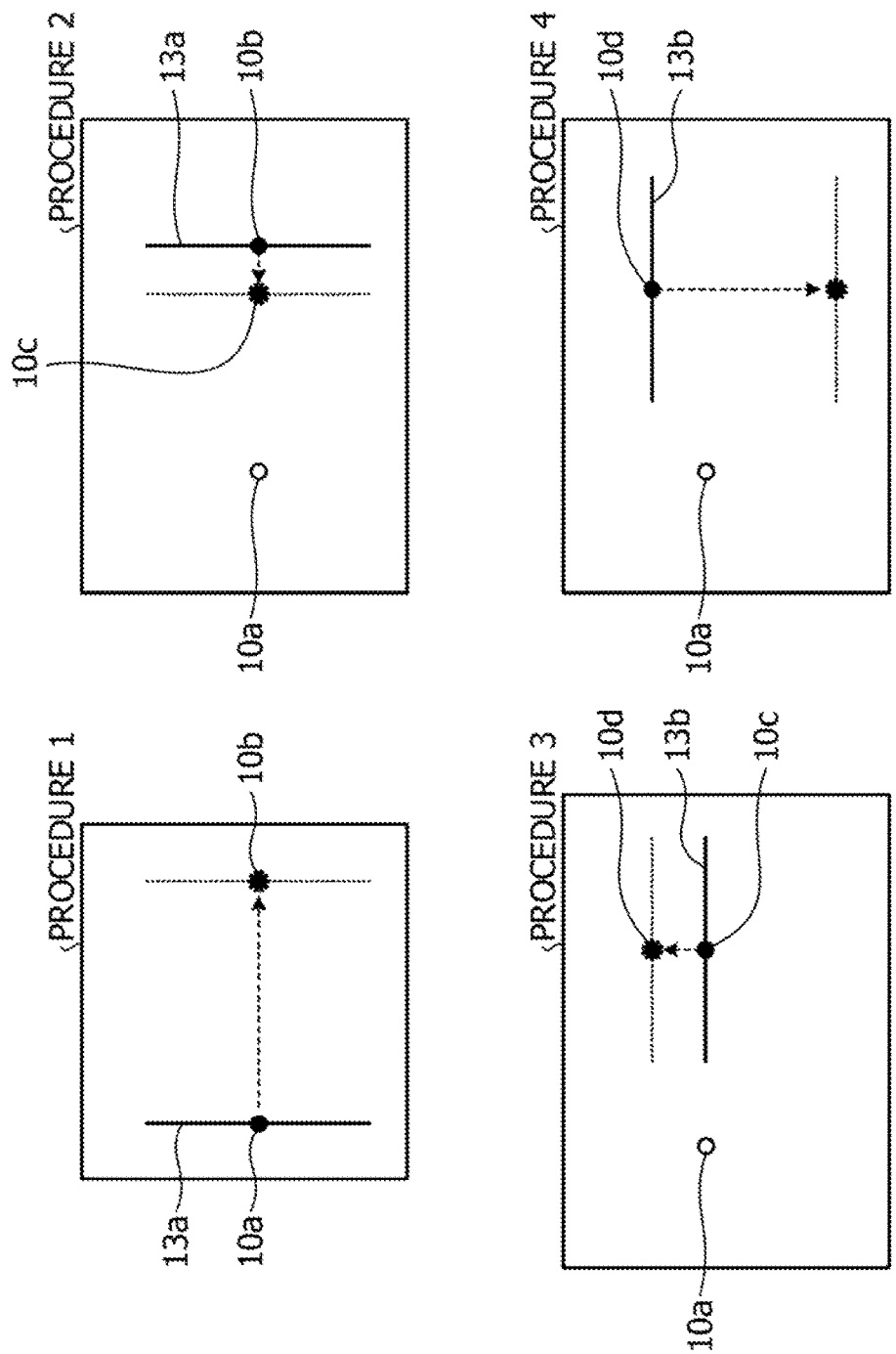
FIG. 10 is a view illustrating a third route definition.

FIG. 10 is a view illustrating a third route definition. The third route definition includes a procedure 1, a procedure 2, a procedure 3, and a procedure 4. The procedure 1 of the third route definition is a procedure for moving the pointer from the pointer position 10a at present in a horizontally rightward direction with a vertical guide 13a.

The procedure 2 of the third route definition is a procedure for moving the pointer from a pointer position 10b determined by the movement of the procedure 1 in a horizontally leftward direction with the vertical guide 13a.

The procedure 3 of the third route definition is a procedure for moving the pointer from a pointer position 10c determined by the movement of the procedure 2 in a vertically upward direction with a horizontal guide 13b.

The procedure 4 of the third route definition is a procedure for moving the pointer from a pointer position 10d determined by the movement of the procedure 3 in a vertically downward direction with the horizontal guide 13b.

It is to be noted that the third route definition described hereinabove is an example, and the procedures 2 and 4 may be omitted from the procedures 1 to 4 of the third route definition, or the procedures 1 and 3 may be omitted.

Figure 11:
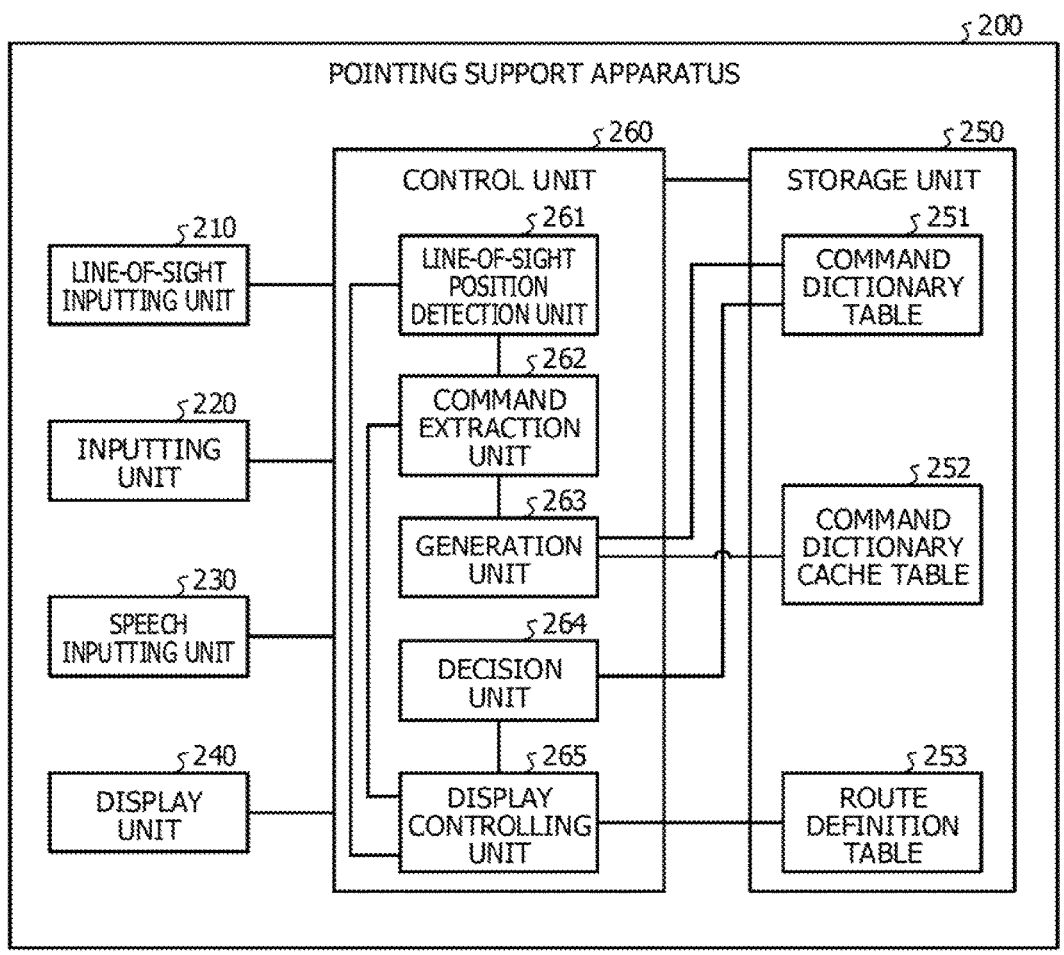
FIG. 11 is a functional block diagram depicting a configuration of a pointing support apparatus according to a working example 2.

Now, a configuration of the pointing support apparatus 200 according to the working example 2 is described. FIG. 11 is a functional block diagram depicting a configuration of a pointing support apparatus according to the working example 2. As depicted in FIG. 11, the pointing support apparatus 200 includes a line-of-sight inputting unit 210, an inputting unit 220, a speech inputting unit 230, a display unit 240, a storage unit 250, and a control unit 260.

Descriptions relating to the line-of-sight inputting unit 210, the inputting unit 220, the speech inputting unit 230, and the display unit 240 are similar to the descriptions relating to the line-of-sight inputting unit 110, the inputting unit 120, the speech inputting unit 130, and the display unit 140 described with reference to FIG. 2. Therefore, overlapping description is omitted herein.

The storage unit 250 includes a command dictionary table 251, a command dictionary cache table 252, and a route definition table 253. The storage unit 250 corresponds to a semiconductor memory element such as a RAM, a ROM, or a flash memory or a storage apparatus such as an HDD.

Descriptions of the command dictionary table 251 and the command dictionary cache table 252 are similar to the descriptions relating to the command dictionary table 151 and the command dictionary cache table 152 described with reference to FIG. 2. The route definition table 253 is a table that retains route definition information that defines a route along which the pointer is moved and a movement pattern of the route. A data structure of the route definition table 253 is similar to the data structure described with reference to FIG. 7, and therefore, description is omitted herein.

The control unit 260 includes a line-of-sight position detection unit 261, a command extraction unit 262, a generation unit 263, a decision unit 264, and a display controlling unit 265. The control unit 260 corresponds to an integration apparatus such as an ASIC or an FPGA. Further, the control unit 260 corresponds to an electronic circuit such as a CPU or an MPU.

The line-of-sight position detection unit 261, the command extraction unit 262, the generation unit 263, and the decision unit 264 perform processes similar to the processes performed by the line-of-sight position detection unit 161, the command extraction unit 162, the generation unit 163, and the decision unit 164 described with reference to FIG. 2. Therefore, overlapping description of the processes is omitted herein.

The display controlling unit 265 is a processing unit that performs a process of outputting screen image information not depicted to the display unit 240 so as to allow the display unit 240 to display the screen image information or a process of accepting pointer movement or selection of a command. If selection of a command is accepted, the display controlling unit 265 executes a process in accordance with the selection of a command and causes the display unit 240 to display a result of the process.

Here, the display controlling unit 265 accepts selection from the user regarding whether pointing is to be supported based on the process 1 or is to be supported based on the process 2. The display controlling unit 265 supports pointing based on the process 1 or the process 2 of the accepted selection.

Figure 12:
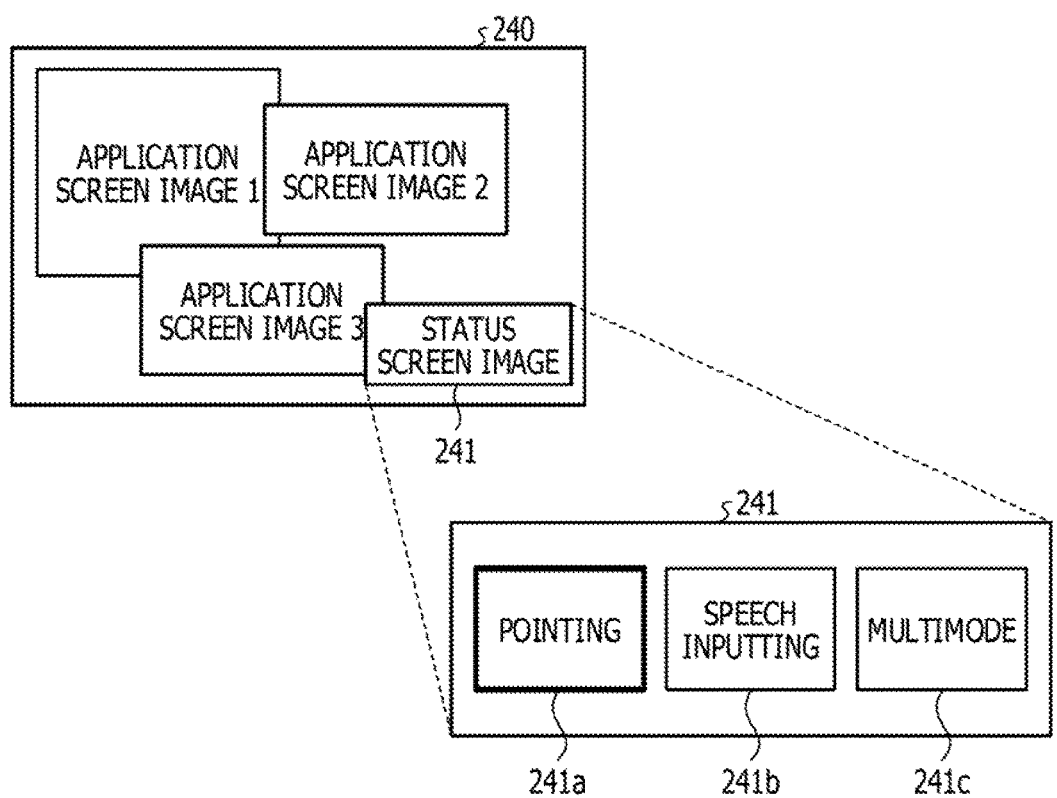
FIG. 12 is a view illustrating a status screen image.

For example, the display controlling unit 265 causes the display unit 240 to display a status screen image to allow the user to select whether pointing is to be supported based on the process 1 or to be supported based on the process 2. FIG. 12 is a view illustrating a status screen image. As depicted in FIG. 12, a status screen image 241 is displayed in a corner region of the display unit 240. Further, the status screen image 241 includes a command 241a for pointing, a command 241b for speech inputting, and a command 241c for a multimode.

For example, if the command 241a for pointing is selected by the user, the display controlling unit 265 supports pointing based on the process 2. If the command 241b for speech inputting is selected by the user, the display controlling unit 265 supports pointing based on the process 1.

If the command 241c for multimode is selected, the display controlling unit 265 dynamically switches the process between the process 1 and the process 2 to support pointing. For example, the display controlling unit 265 performs switching from the process 1 to the process 2 or switching from the process 2 to the process 1 at a timing at which a switching instruction is accepted from the user. The user may perform the switching instruction in any manner. For example, the user may perform long-press of the button of the inputting unit 220 to issue a switching instruction to the display controlling unit 265, or the user may utter "switch" to issue a switching instruction to the display controlling unit 265.

Here, the user may receive support for pointing by the display controlling unit 265 to select one of the respective commands 241a to 241c, or may select one of the respective commands 241a to 241c through speech. For example, if the display controlling unit 265 recognizes by speech recognition that the user utters "pointing," the display controlling unit 265 decides that the command 241a is selected. For example, if the display controlling unit 265 recognizes by speech recognition that the user utters "speech input," the display controlling unit 265 decides that the command 241b is selected. Further, if the display controlling unit 265 recognizes by speech recognition that the user utters "multimode," the display controlling unit 265 decides that the command 241c is selected.

Now, an example of pointing support of the process 1 and pointing support of the process 2 both executed by the display controlling unit 265 is described.

Pointing support of the "process 1" is similar to the pointing support of the display controlling unit 165 depicted in FIG. 2. For example, when the display controlling unit 265 acquires position coordinates from the decision unit 264, the display controlling unit 265 moves the pointer to a position on the screen image corresponding to the position coordinates. If the display controlling unit 265 accepts a signal of depression of the button from the inputting unit 220, the display controlling unit 265 decides that a command at a position overlapping with the pointer is selected and executes a process in accordance with the command.

Figure 13:
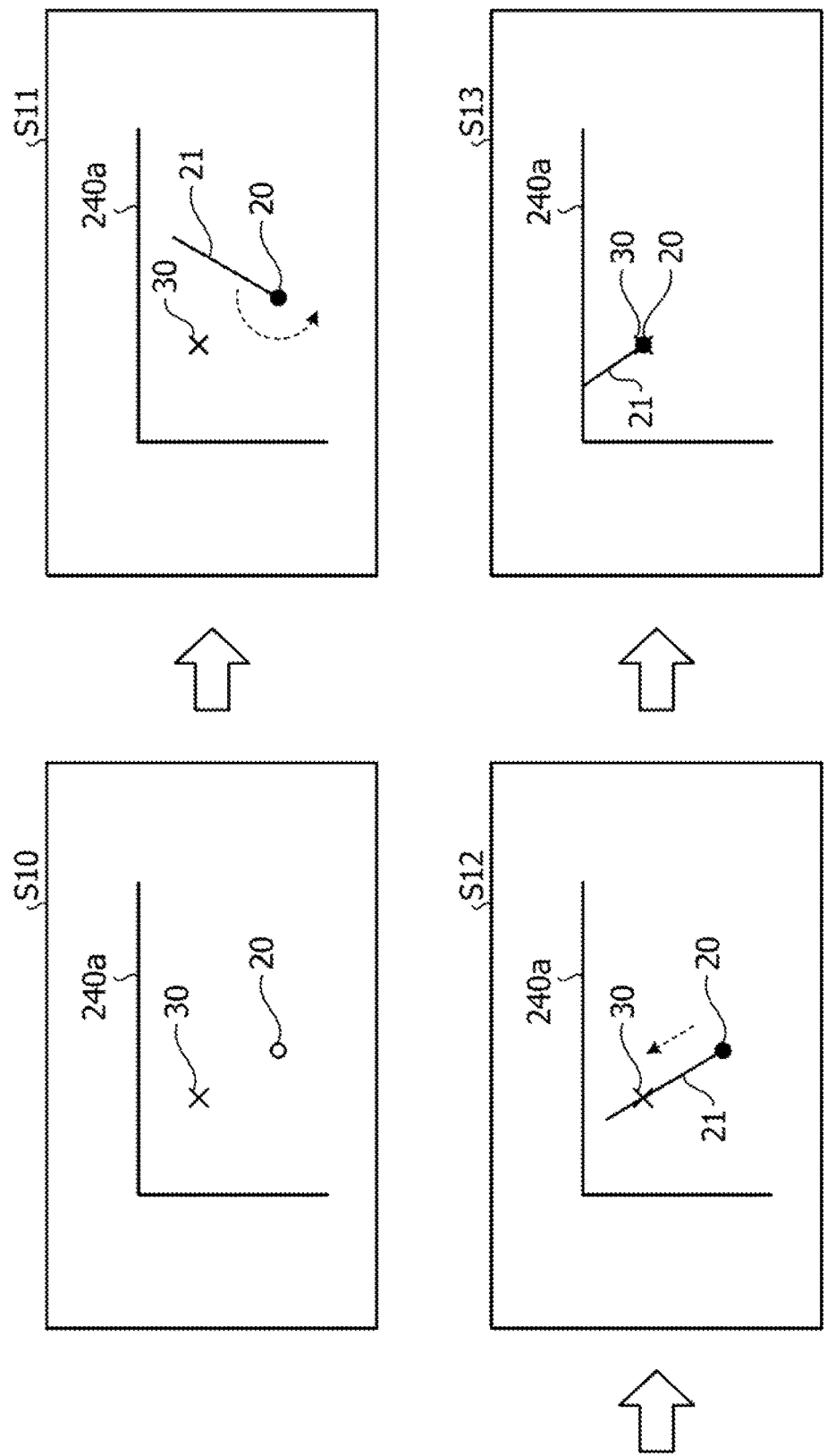
FIG. 13 is a view illustrating a process of a display controlling unit.
Figure 14:
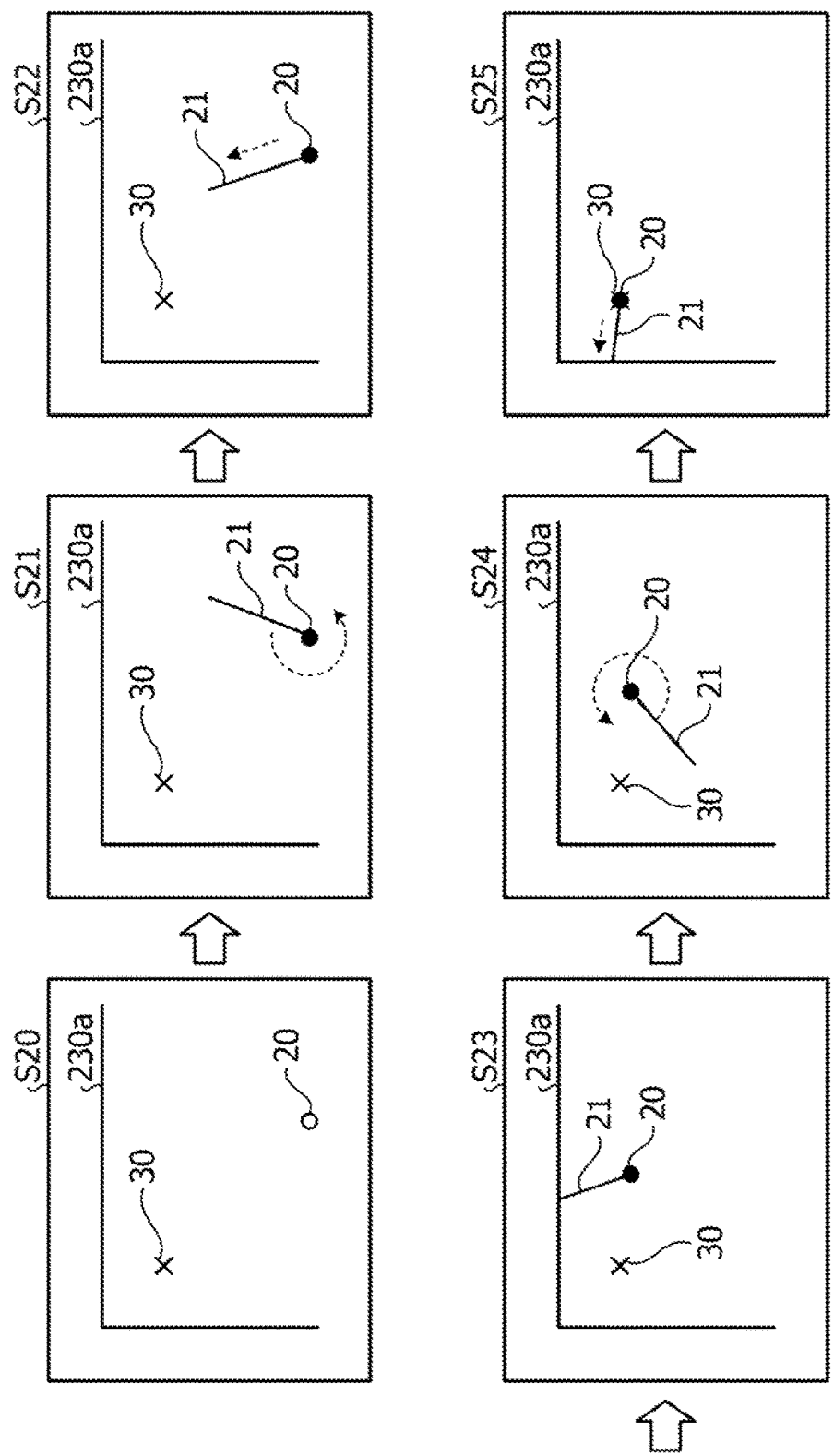
FIG. 14 is a view illustrating the process of the display controlling unit.

Pointing support of the "process 2" is described. FIGS. 13 and 14 are views illustrating the process 2 of the display controlling unit. FIGS. 13 and 14 illustrate an example of a case in which the display controlling unit 265 executes a process based on the first route definition of the route definition table 253.

The process at step S10 of FIG. 13 is described. A screen image 240a of the display unit 240 has a target 30 of pointing and a line-of-sight position 20 thereon. The display controlling unit 265 specifies the position of the line-of-sight position 20 based on information of the line-of-sight position 20 acquired from the line-of-sight position detection unit 261. The display controlling unit 265 updates the line-of-sight position 20 every time acquiring information of the line-of-sight position 20 from the line-of-sight position detection unit 261 until after the button of the inputting unit 220 is depressed.

The process at step S11 of FIG. 13 is described. If the button of the inputting unit 220 is depressed by the user and the display controlling unit 265 accepts a signal from the inputting unit 220, the display controlling unit 265 determines the line-of-sight position 20 as an initial position of the pointer. For example, while the button of the inputting unit 220 is kept depressed, the display controlling unit 265 causes a linear movement bar 21 to be displayed and rotate around the initial position 20 of the pointer.

When the display controlling unit 265 causes the linear movement bar 21 to be rotated, the display controlling unit 265 may adjust the speed of the rotation in response to the strength of the depression of the button of the inputting unit 220. The display controlling unit 265 acquires information of the strength of the depression of the button from the inputting unit 220. When the strength of the depression of the button is equal to or higher than a threshold value, the display controlling unit 265 causes the linear movement bar 21 to rotate at a first speed of rotation. When the strength of the depression of the button is lower than the threshold value, the display controlling unit 265 causes the linear movement bar 21 to rotate at a second speed of rotation. The first speed of rotation is higher than the second speed of rotation.

The process at step S12 of FIG. 13 is described. The user refers to the screen image 240a and release the button of the inputting unit 220 at a timing at which the linear movement bar 21 overlaps with the target 30. If the display controlling unit 265 detects that the button of the inputting unit 220 is not depressed any more, the display controlling unit 265 causes the linear movement bar 21 to stop the rotation. Then, the display controlling unit 265 causes the linear movement bar 21 to linearly move in the direction indicated by the linear movement bar 21.

The process at step S13 of FIG. 13 is described. The user refers to the screen image 240a and depress the button of the inputting unit 220 at a point of time at which the start point (pointer position 20) of the linear movement bar 21 overlaps with the target 30. When the display controlling unit 265 detects that the button of the inputting unit 220 is depressed at a point of time at which the start point (pointer position 20) of the linear movement bar 21 overlaps with the target 30, the display controlling unit 265 decides that the target 30 is selected. The display controlling unit 265 executes a given process in response to the selection of the target 30.

As the display controlling unit 265 executes the processes at steps S10 to S13 of FIG. 13, pointing may be executed appropriately in response to a line-of-sight input. For example, every time the button of the inputting unit 220 is depressed, the target 30 may be selected through the procedure of setting of an initial position of the pointer, rotation of the linear movement bar 21, and linear movement of the linear movement bar 21. Consequently, even if the accuracy of the line-of-sight position is low, the target 30 may be selected appropriately. Further, since the operation of depressing the button of the inputting unit 220 is simple, even a physically disabled person, an elderly or the like may handle the inputting unit 220.

Now, description is given with reference to FIG. 14. The process at step S20 of FIG. 14 is described. The screen image 240a of the display unit 240 has a target 30 of pointing and a line-of-sight position 20. The display controlling unit 265 specifies the position of the line-of-sight position 20 based on information of the line-of-sight position 20 acquired from the line-of-sight position detection unit 261. The display controlling unit 265 updates the line-of-sight position 20 on the screen image 240a every time acquiring information of the line-of-sight position 20 from the line-of-sight position detection unit 261 until after the button of the inputting unit 220 is single-clicked.

The process at step S21 of FIG. 14 is described. If the button of the inputting unit 220 is single-clicked by the user and the display controlling unit 265 accepts a signal from the inputting unit 220, the display controlling unit 265 determines the line-of-sight position 20 as an initial position of the pointer. For example, the display controlling unit 265 causes the linear movement bar 21 to be kept displayed and rotated around the initial position 20 of the pointer while the button of the inputting unit 220 continues to be depressed.

The process at step S22 of FIG. 14 is described. The user refers to the screen image 240a and release the button of the inputting unit 220 at a certain timing. If the display controlling unit 265 detects that the button of the inputting unit 220 is not depressed any more, the display controlling unit 265 causes the linear movement bar 21 to stop the rotation. Then, the display controlling unit 265 causes the linear movement bar 21 to move linearly in the direction indicated by the linear movement bar 21.

The process at step S23 of FIG. 14 is described. If the button of the inputting unit 220 is single-clicked by the user while the linear movement bar 21 is moved linearly, the display controlling unit 265 decides that a start point (pointer position 20) of the linear movement bar 21 at the point of time at which the single click is performed is selected similarly as at step S13 of FIG. 13. Then, the display controlling unit 265 ends the process.

On the other hand, if the button of the inputting unit 220 is double-clicked by the user while the linear movement bar 21 is moved linearly, the display controlling unit 265 sets the pointer position 20 at present as the initial position of the pointer.

The process at step S24 of FIG. 14 is described. While the button of the inputting unit 220 is kept depressed, the display controlling unit 265 causes the linear movement bar 21 to be displayed and rotated around the initial position 20 of the pointer. For example, when a double click is performed, the user continues button depression by continuing button depression for the second time.

The display controlling unit 265 may make the speed of rotation of the linear movement bar 21 at step S24 lower than the speed of rotation of the linear movement bar 21 at step S21. The distance between the pointer position for the second time and the target 30 is shorter than the distance between the pointer position for the first time and the target 30. Therefore, by making the speed of rotation of the linear movement bar 21 from the start point that is the pointer position for the second and succeeding times lower, the direction of the linear movement bar 21 may be adjusted readily to the target 30.

The process at step S25 of FIG. 14 is described. The user refers to the screen image 240a and release the button of the inputting unit 220 at a certain timing. When the display controlling unit 265 detects that the button of the inputting unit 220 is not depressed any more, the display controlling unit 265 causes the linear movement bar 21 to stop the rotation. Then, the display controlling unit 265 causes the linear movement bar 21 to linearly move in a direction indicated by the linear movement bar 21. If the button of the inputting unit 220 is single-clicked by the user while the linear movement bar 21 is linearly moved, the display controlling unit 265 decides that the target 30 positioned at a start point (pointer position 20) of the linear movement bar 21 at the point of time at which the single click is performed is selected similarly as at step S13 of FIG. 13.

Incidentally, although the display controlling unit 265 performs when the button of the inputting unit 220 is double-clicked at step S23, the processes at steps S24 and S25 in accordance with the first route definition again, the process of the display controlling unit 265 is not limited to this. For example, every time the button of the inputting unit 220 is double-clicked, the display controlling unit 265 may switch the route to the second route definition or the third route definition to perform the later processes. Whether or not the procedure is to be switched to another route definition is set in advance to the pointing support apparatus 200 by the user.

Figure 15:
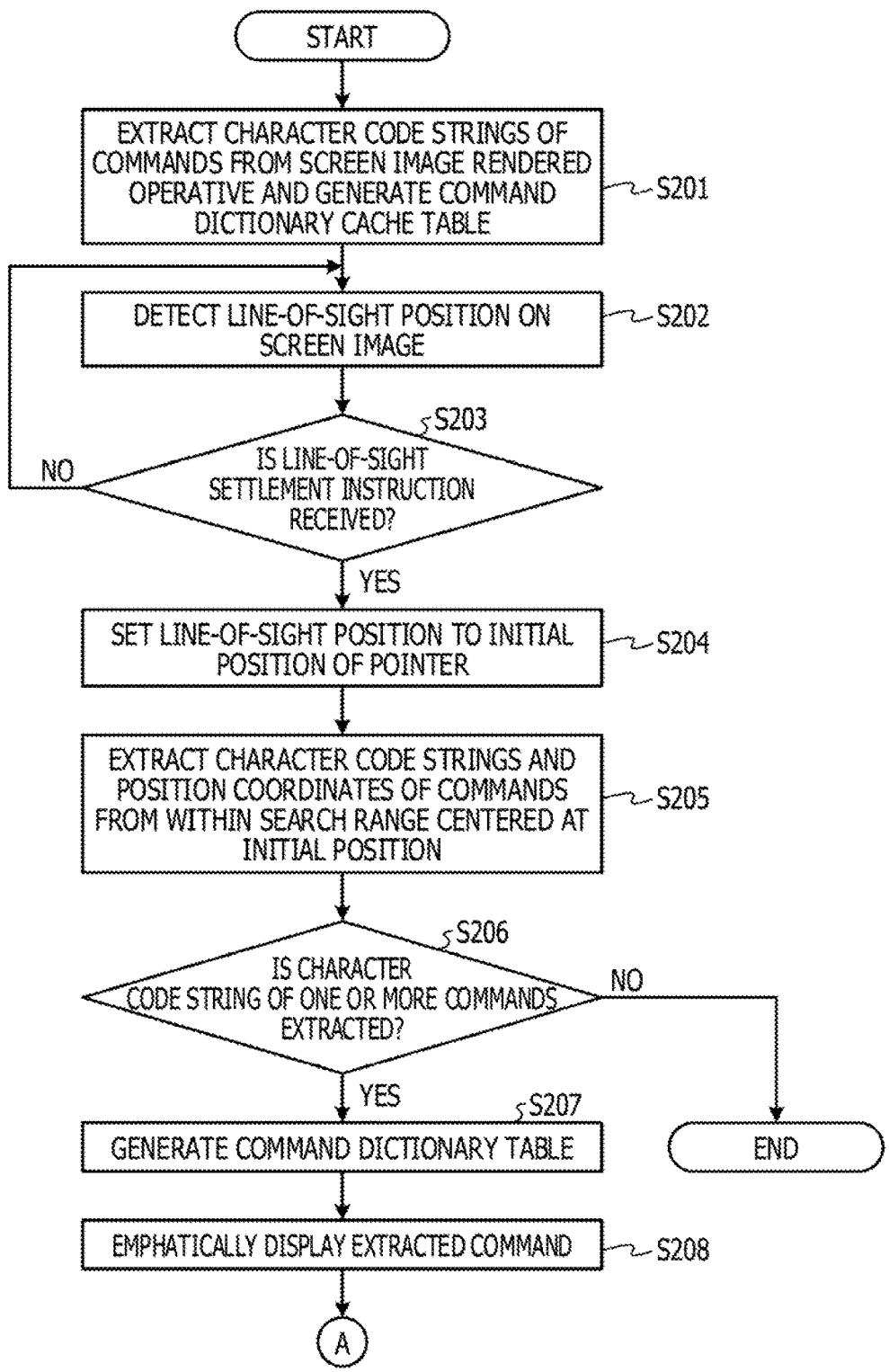
FIG. 15 is a flow chart illustrating a processing procedure of a pointing support apparatus according to the working example 2.
Figure 16:
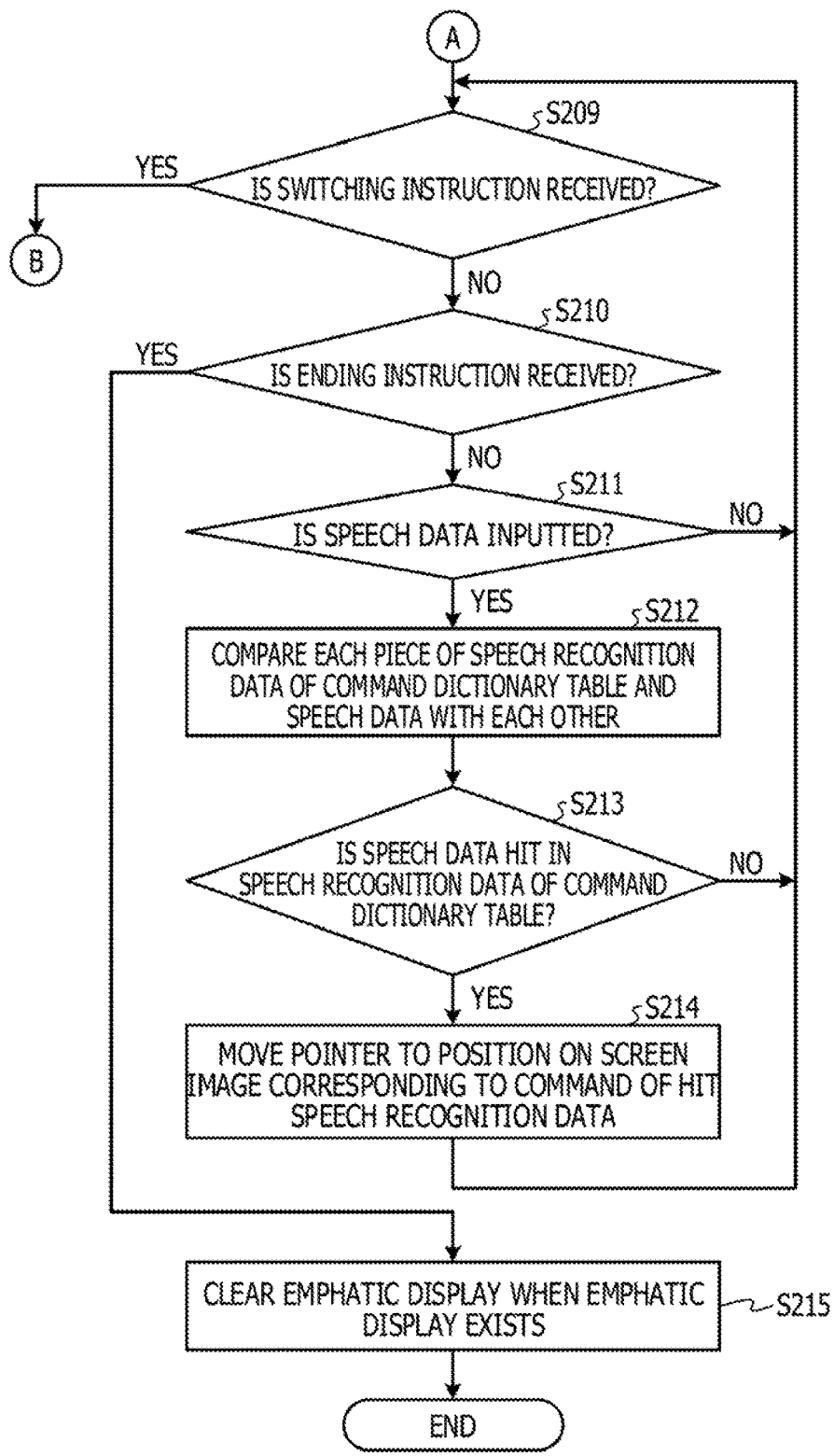
FIG. 16 is a flow chart illustrating a processing procedure of the pointing support apparatus according to the working example 2.
Figure 17:
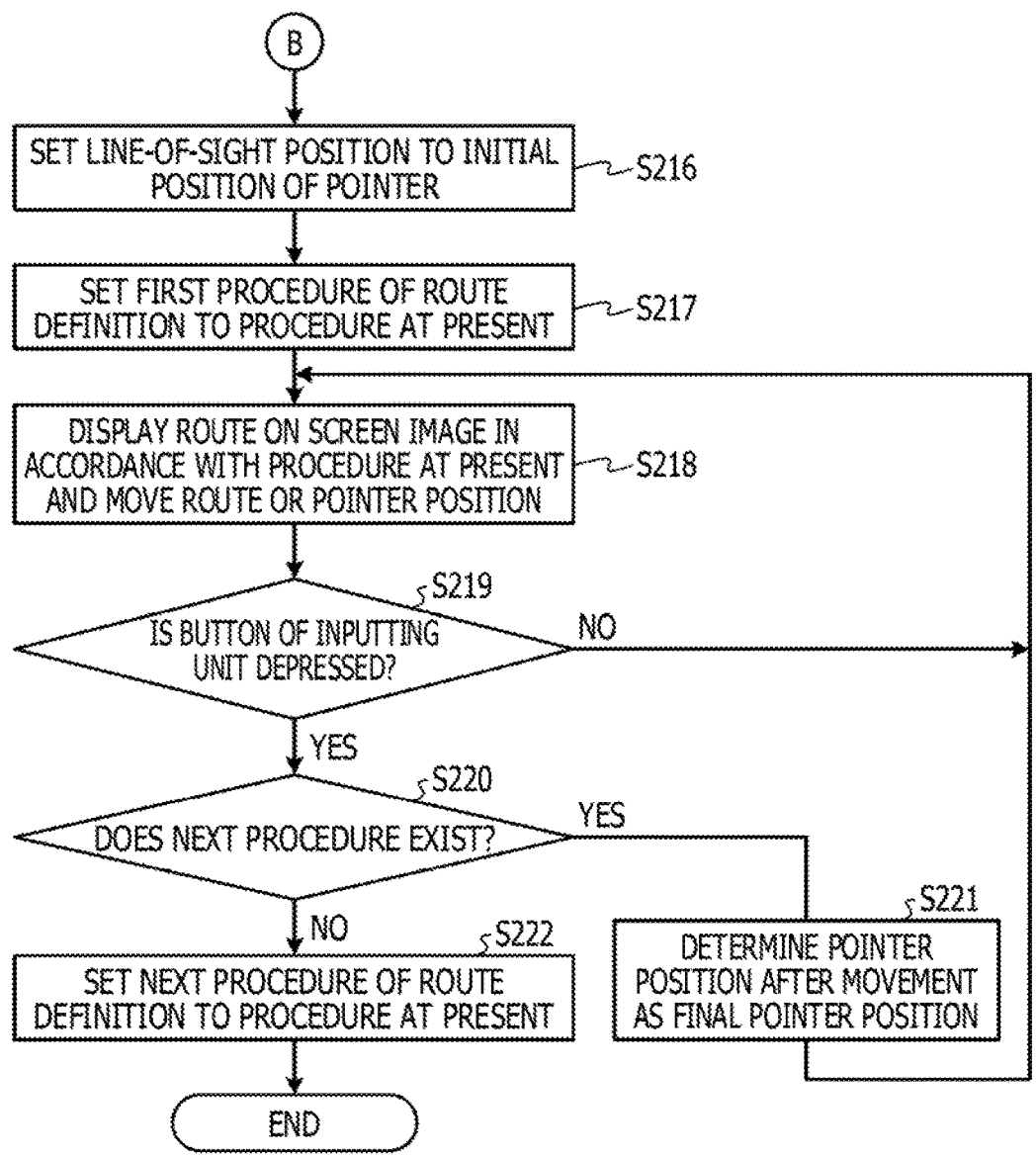
FIG. 17 is a flow chart illustrating a processing procedure of the pointing support apparatus according to the working example 2.

Now, a processing procedure of the pointing support apparatus 200 according to the working example 2 is described. FIGS. 15, 16, and 17 are flow charts illustrating a processing procedure of a pointing support apparatus according to the working example 2. As illustrated in FIG. 15, the generation unit 263 of the pointing support apparatus 200 extracts character code strings of commands from a screen image rendered operative and generates a command dictionary cache table 252 (step S201).

The line-of-sight position detection unit 261 of the pointing support apparatus 200 detects the line-of-sight position on the screen image (step S202). The line-of-sight position detection unit 261 decides whether or not a line-of-sight settlement instruction is received (step S203). If a line-of-sight settlement instruction is not received (step S203, No), the line-of-sight position detection unit 261 advances the process to step S202. If a line-of-sight settlement instruction is received (step S203, Yes), the line-of-sight position detection unit 261 advances the process to step S204. For example, if the button of the inputting unit 220 is depressed by the user, the line-of-sight position detection unit 261 decides that a line-of-sight settlement instruction is received.

The command extraction unit 262 of the pointing support apparatus 200 sets the line-of-sight position to an initial position of the pointer (step S204). The command extraction unit 262 extracts character code strings and position, coordinates of commands from within a search range centered at the initial position (step S205). The command extraction unit 262 decides whether or not a character code string of one or more commands is extracted (step S206). If a character code string of one or more commands is not extracted (step S206, No), the command extraction unit 262 ends the process. If a character code string of one or more commands is extracted (step S206, Yes), the command extraction unit 262 advances the process to step S207.

The generation unit 263 of the pointing support apparatus 200 generates a command dictionary table 251 based on the command or commands extracted by the command extraction unit 262 and the command dictionary cache table 252 (step S207). The display controlling unit 265 of the pointing support apparatus 200 causes the extracted command or commands to be displayed emphatically (step S208) and advances the process to step S209 of FIG. 16.

The display controlling unit 265 of the pointing support apparatus 200 decides whether or not a switching instruction is received (step S209). If a switching instruction is received (step S209, Yes), the display controlling unit 265 advances the process to step S216 of FIG. 17. On the other hand, if a switching instruction is not received (step S209, No), the display controlling unit 265 advances the process to step S210.

First, the processes at the steps beginning with step S210 of FIG. 16 are described. The display controlling unit 265 decides whether or not an ending instruction is received (step S210). If an ending instruction is received (step S210, Yes), the display controlling unit 265 advances the process to step S215. For example, if the display controlling unit 265 detects that the button of the inputting unit 220 is depressed short, the display controlling unit 265 decides that an ending instruction is received. Alternatively, when the user utters "end" in place of depressing the button of the inputting unit 220 and the display controlling unit 265 executes speech recognition and recognizes that "end" is uttered, the display controlling unit 265 may decide that an ending instruction is received.

If an emphatic display exists, the display controlling unit 265 clears the emphatic display (step S215) and ends the process. If an ending instruction is not received (step S210, No), the display controlling unit 265 advances the process to step S211.

The decision unit 264 of the pointing support apparatus 200 decides whether or not some speech data is inputted (step S211). If no speech data is inputted (step S211, No), the decision unit 264 advances the process to step S209. If some speech data is inputted (step S211, Yes), the decision unit 264 advances the process to step S212.

The decision unit 264 compares each piece of the speech recognition data of the command dictionary table 251 and the speech data with each other (step S212). The decision unit 264 decides whether or not the speech data is hit in some data for speech recognition of the command dictionary table 251 (step S213). If the speech data is not hit in any of the data for speech recognition of the command dictionary table 251 (step S213, No), the decision unit 264 advances the process to step S209. If the speech data is hit in some data for speech recognition of the command dictionary table 251 (step S213, Yes), the decision unit 264 advances the process to step S214.

The display controlling unit 265 moves the pointer to a position on the screen image corresponding to the command of the hit speech recognition data (step S214) and advances the process to step S209.

Now, the processes at steps beginning with step S216 of FIG. 17 are described. The display controlling unit 265 sets the line-of-sight position as an initial position of the pointer (step S216). The display controlling unit 265 refers to the route definition table 253 and sets the first procedure of the route definition to the procedure at present (step S217).

The display controlling unit 265 causes a route to be displayed on the screen image in accordance with the procedure at present and moves the route or the pointer position (step S218). If the button of the inputting unit 220 is not depressed (step S219, No), the display controlling unit 265 advances the process to step S218 again.

On the other hand, if the button of the inputting unit 220 is depressed (step S219, Yes), the display controlling unit 265 decides whether or not a next procedure exists (step S220). If a next procedure exists (step S220, Yes), the display controlling unit 265 sets the next procedure of the route definition to the procedure at present (step S221) and advances the process to step S218.

On the other hand, if a next procedure does not exist (step S220, No), the display controlling unit 265 determines the pointer position after the movement as the final pointer position (step S222).

Now, an advantageous effect of the pointing support apparatus 200 according to the working example 2 is described. The pointing support apparatus 200 performs switching between the process 1 of combining a line-of-sight input and speech recognition to support pointing and the process 2 of using a line-of-sight input and the route definition table 253 to support pointing. Therefore, if the process 1 fails to successfully perform speech recognition, a command may be selected appropriately by switching to the process 2.

Here, the processes of the pointing support apparatus 100 and 200 described hereinabove in connection with the working example 1 and the working example 2 are an example, and the pointing support apparatus 100 and 200 may perform some other processes. In the following, other processes (1) to (3) of the pointing support apparatus 100 and 200 are described. In the following description, processes are described with reference to the functional block diagram of the pointing support apparatus 200 depicted in FIG. 11 for the convenience of description.

The other process (1) of the pointing support apparatus is described. When the generation unit 263 of the pointing support apparatus 200 generates a command dictionary cache table 252, the generation unit 263 may generate a command dictionary cache table 252 separately for each screen image. For example, as depicted in FIG. 1, when the application screen image 50 is rendered operative, the generation unit 263 extracts the commands 51a to 51g included in the application screen image 50 and generates a command dictionary cache table 252 corresponding to the application screen image 50. Then, for example, if the command 51d for reply is selected and a new screen image is displayed, the generation unit 263 extracts all command included in the newly displayed screen image and generates a command dictionary cache table 252 corresponding to the new screen image. Every time a new screen image is rendered operative, the generation unit 263 repetitively executes the processes described above.

Since the generation unit 263 generates a command dictionary cache table 252 for each screen image in this manner, the search efficiency for speech recognition data used in the command dictionary table 251 may be improved. For example, when the generation unit 263 generates a command dictionary table 251, by setting screen image information that includes commands in the search range as a key, it becomes possible for the generation unit 263 to narrow down the command dictionary cache table 252 to be made a search target. This improves the search efficiency.

The other process (2) of the pointing support apparatus is described. After the generation unit 263 of the pointing support apparatus 200 generates a command dictionary cache table 252, the generation unit 263 may perform such a process as to leave records of command character code strings having a high use frequency while erasing the other records. For example, every time a command is selected by the user, the generation unit 263 increments the number of times of use of a character code string corresponding to the command in the command dictionary cache table 252 by one by the process 1 or the process 2 described hereinabove. The generation unit 263 repetitively executes the process described above, calculates a use frequency of each character code string, and leaves n records having a comparatively high use frequency in the command dictionary cache table 252 while deleting the remaining records. Where the generation unit 263 performs such a process as just described, the resources of the storage unit 250 may be utilized effectively.

The other process (3) of the pointing support apparatus is described. If commands having a high use frequency are designated in advance, the generation unit 263 of the pointing support apparatus 200 may store speech recognition data of the commands having the high use frequency into the command dictionary cache table 252 in advance. For example, the generation unit 263 stores speech recognition data corresponding to file, home, copy, paste, open, close, and store commands and so forth in advance into the command dictionary cache table 252. By performing such a process, the processing load upon generation of speech recognition data may be reduced.

Figure 18:
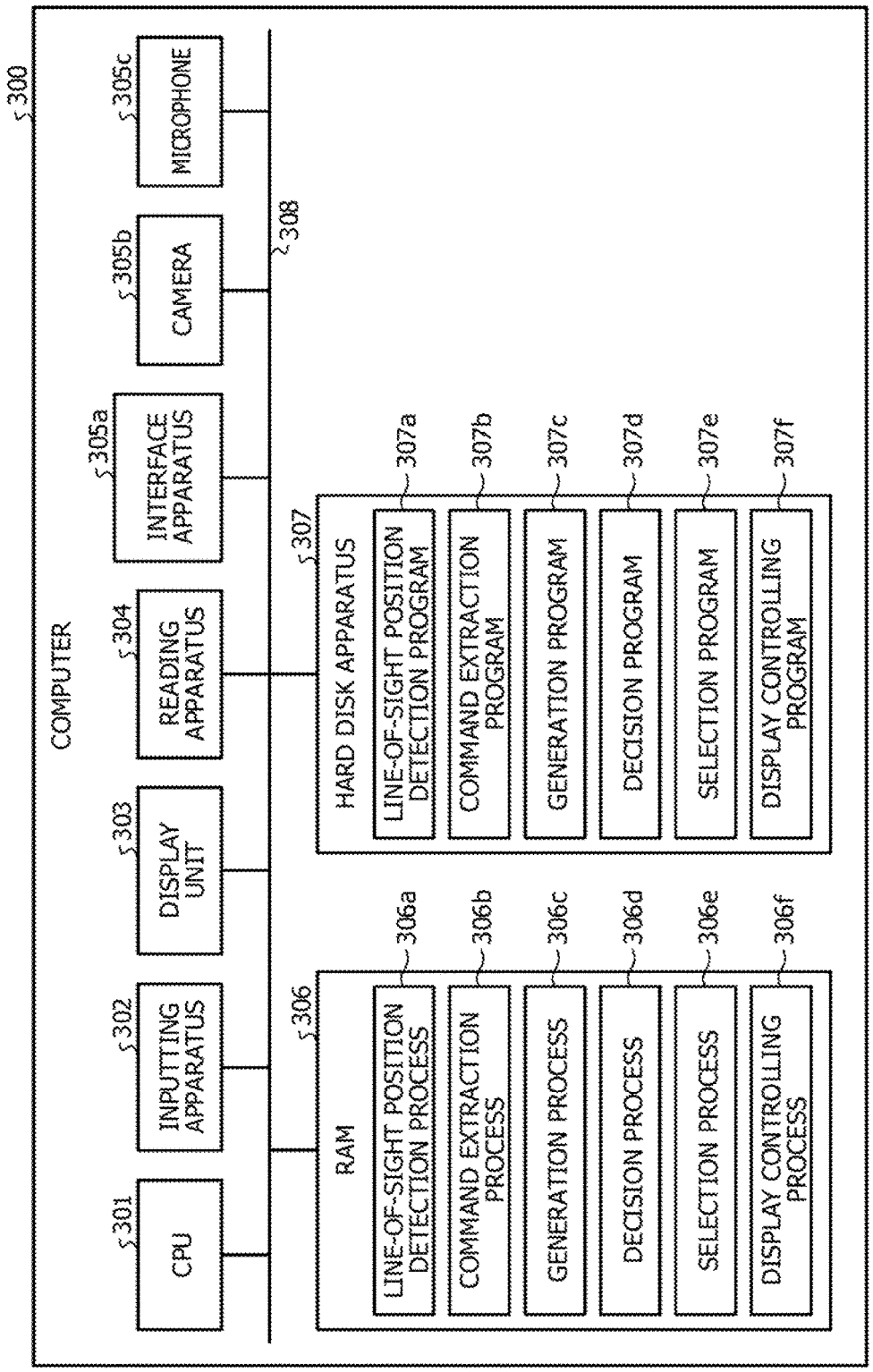
FIG. 18 is a view depicting an example of a computer that executes a pointing support program.
Figure 19:
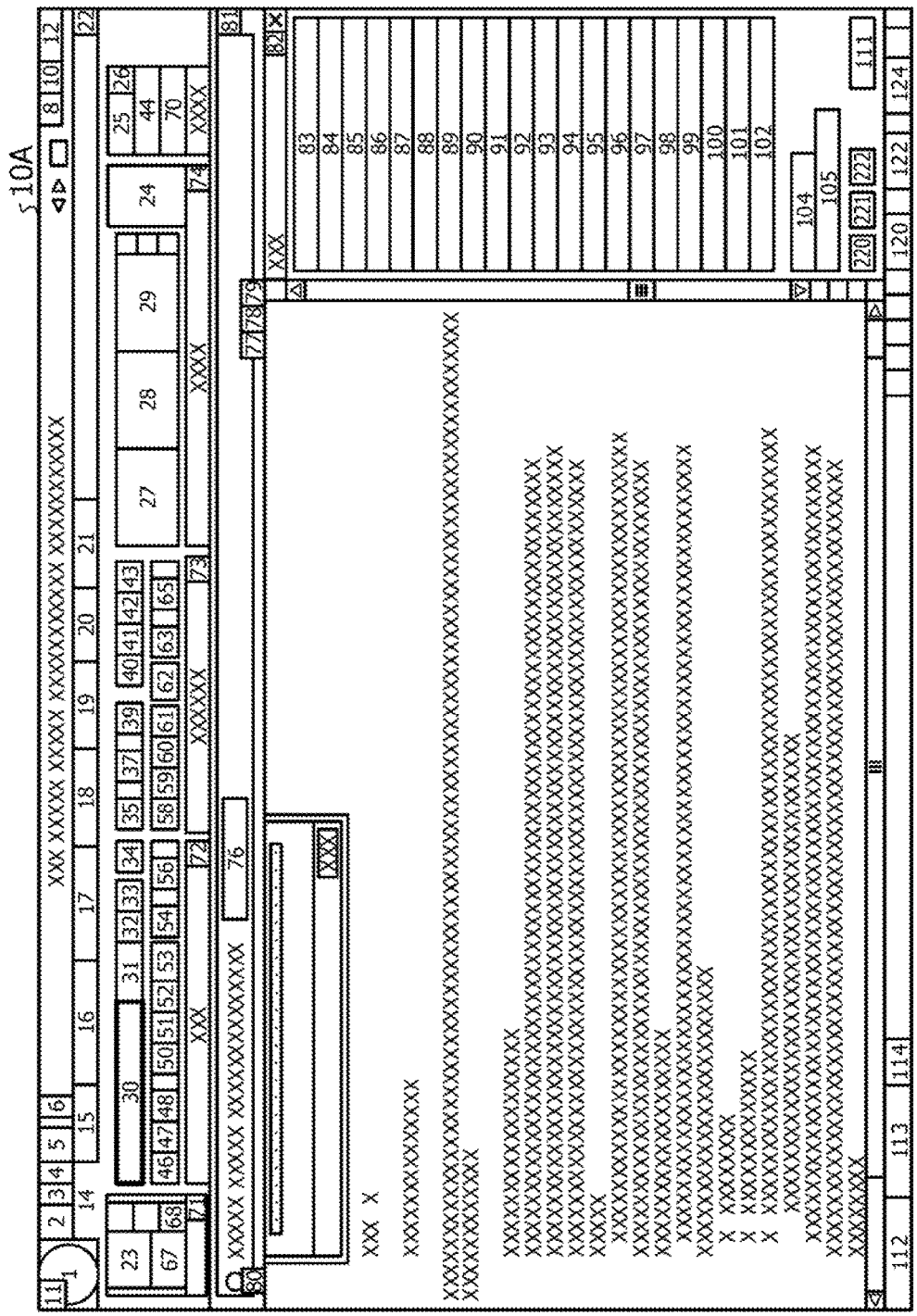
FIG. 19 is a view illustrating a conventional technology.

Now, an example of a computer that executes a pointing support program that implements functions similar to the functions of the pointing support apparatus 100 and 200 described hereinabove in the working examples is described. FIG. 18 is a view depicting an example of a computer that executes a pointing support program.

As depicted in FIG. 18, a computer 300 includes a CPU 301 that executes various arithmetic operation processes, an inputting apparatus 302 that accepts an input of data from a user, and a display unit 303. Further, the computer 300 includes a reading apparatus 304 that reads a program and so forth from a storage medium, an interface apparatus 305a that transmits and receives data to and from another computer through a network, a camera 305b, and a microphone 305c. The computer 300 further includes a RAM 306 that temporarily stores various kinds of information, and a hard disk apparatus 307. Each of the apparatus 301 to 307 is coupled to a bus 308.

The hard disk apparatus 307 includes a line-of-sight position detection program 307a, a command extraction program 307b, a generation program 307c, a decision program 307d, a selection program 307e, and a display controlling program 307f. The CPU 301 reads out the line-of-sight position detection program 307a, the command extraction program 307b, the generation program 307c, the decision program 307d, the selection program 307e, and the display controlling program 307f and deploys them to the RAM 306.

The line-of-sight position detection program 307a functions as a line-of-sight position detection process 306a. The command extraction program 307b functions as a command extraction process 306b. The generation program 307c functions as a generation process 306c. The decision program 307d functions as a decision process 306d. The selection program 307e functions as a selection process 306e. The display controlling program 307f functions as a display controlling process 306f.

The process of the line-of-sight position detection process 306a corresponds to the processes of the line-of-sight position detection units 161 and 261. The process of the command extraction process 306b corresponds to the processes of the command extraction units 162 and 262. The process of the generation process 306c corresponds to the processes of the generation units 163 and 263. The process of the decision process 306d corresponds to the processes of the decision units 164 and 264. The process of the display controlling process 306f corresponds to the processes of the display controlling units 165 and 265.

It is to be noted that each of the programs 307a to 307f may not necessarily be stored in the hard disk apparatus 307 from the beginning. For example, each of the programs is stored into a "portable physical medium" such as, a flexible disk (FD), a compact disc (CD)-ROM, a digital versatile disc (DVD) disk, a magneto-optical disk, or an integrated circuit (IC) card to be inserted into the computer 300. Then, the computer 300 may read out and execute each of the programs 307a to 307f.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A pointing support apparatus comprising:
a memory; and
a processor coupled to the memory and configured to:
detect an activation of a screen based on an operation of a user;
scan the screen to extract first information regarding character strings of commands on the screen;
generate first speech information corresponding to the first information;
register, in a first table, the first information and the first speech information in association with each other;
detect a line-of-sight position of the user on the screen;
set the line-of-sight position as an initial position of a pointer;
extract one or more commands included in a search range of the screen, which is defined based on the line-of-sight position and is smaller than the screen, to generate second information regarding character strings of the one or more commands;

generate a second table in which the second information and the first speech information stored in the first table are associated with each other;

compare, when first speech information from the user is recognized, the recognized first speech information and the first speech information of the second table;

specify the second information having the first speech information which matches the recognized first speech information; and move the pointer on the screen to a command corresponding to the specified second information, wherein the processor causes, based on route definition information that defines a route along which the pointer is moved and a movement pattern of the route, the route whose start point is given by the initial position to be displayed on the screen, and causes the pointer to move along the route.

2. The pointing support apparatus according to claim 1, wherein the processor accepts selection of one of a first process to move the pointer to a position of the command corresponding to the specified second information and a second process to move the pointer based on the route definition information, and switches a process between the first process and the second process.

3. The pointing support apparatus according to claim 1, wherein the processor generates the first information regarding character strings of all commands which exist on the screen.

4. The pointing support apparatus according to claim 3, wherein the processor generates, when one command on the screen is selected and another screen is displayed, second speech information of all commands which exist on the second screen, and stores the second speech information in the memory.

5. The pointing support apparatus according to claim 3, wherein, every time the one or more commands are extracted, the processor increases a use frequency of the first speech information corresponding to the one or more commands and stored in the first table and preferentially leaves first speech information whose use frequency is high in the first table.

6. A pointing support method comprising:
detecting, by a processor, an activation of a screen based on an operation of a user;
scanning the screen to extract first information regarding character strings of commands on the screen;
generating first speech information corresponding to the first information;
registering, in a first table, the first information and the first speech information in association with each other;
detecting a line-of-sight position of the user on the screen;
setting the line-of-sight position as an initial position of a pointer;
extracting one or more commands included in a search range of the screen, which is defined based on the line-of-sight position and is smaller than the screen, to generate second information regarding character strings of the one or more commands;
generating a second table in which the second information and the first speech information stored in the first table are associated with each other;
comparing, when first speech information from the user is accepted, the accepted first speech information and the first speech information of the second table;
specifying the second information having the first speech information which matches the accepted first speech information;
moving the pointer on the screen to a command corresponding to the specified second information;
displaying, based on route definition information that defines a route along which the pointer is moved and a movement pattern of the route, the route whose start point is given by the initial position on the screen; and
moving the pointer along the route.

7. The pointing support method according to claim 6, further comprising:
accepting selection of one of a first process to move the pointer to a position of the command corresponding to the specified second information and a second process to move the pointer based on the route definition information; and
switching a process between the first process and the second process.

8. The pointing support method according to claim 6, wherein the first information regarding character strings of all commands which exist on the screen is generated.

9. The pointing support method according to claim 8, further comprising:
generating, when one command on the screen is selected and another screen is displayed, second speech information of all commands which exist on the second screen; and
storing the second speech information in a memory.

10. The pointing support method according to claim 8, further comprising:
increasing, every time the one or more commands are extracted, a use frequency of the first speech information corresponding to the one or more commands and stored in the first table; and
preferentially leaving first speech information whose use frequency is high in the first table.

* * * * *